United States Patent [19]

Tanaka et al.

[11] Patent Number: 4,809,101
[45] Date of Patent: Feb. 28, 1989

[54] AUTOMATIC STOPPING MECHANISM FOR A TAPE FEEDING DEVICE

[75] Inventors: Shinsaku Tanaka, Tokyo; Tadao Arata, Inagi, both of Japan

[73] Assignee: Tanashin Denki Co., Ltd., Japan

[21] Appl. No.: 66,195

[22] Filed: Jun. 25, 1987

[30] Foreign Application Priority Data

Dec. 31, 1986 [JP] Japan .............................. 61-313107
Mar. 10, 1987 [JP] Japan .......................... 62-35003[U]

[51] Int. Cl.$^4$ ...................... G11B 15/02; G11B 15/18; G11B 15/22
[52] U.S. Cl. .................................. 360/96.4; 360/96.3; 360/74.2; 360/74.1
[58] Field of Search ....................... 360/96.3, 96.4, 93, 360/96.1, 137, 74.1, 74.2

[56] References Cited

U.S. PATENT DOCUMENTS

| | | | |
|---|---|---|---|
| 4,227,223 | 10/1980 | Magata et al. | 360/96.3 |
| 4,495,532 | 1/1985 | Kurafuzi et al. | 360/74.1 |
| 4,495,534 | 1/1985 | Kurafuji | 360/74.1 |
| 4,604,662 | 8/1986 | Ida et al. | 360/74.2 |

FOREIGN PATENT DOCUMENTS

| | | | |
|---|---|---|---|
| 54-102110 | 8/1979 | Japan | 360/74.2 |
| 54-125008 | 9/1979 | Japan | 360/74.2 |
| 55-142439 | 11/1980 | Japan | 360/74.2 |

Primary Examiner—John H. Wolff
Assistant Examiner—Matthew J. Bussan
Attorney, Agent, or Firm—Wegner & Bretschneider

[57] ABSTRACT

An automatic stopping mechanism for a tape feeding device which can detect an end of a tape to operate while the tape feeding device is in any of reproducing, recording, fast feeding and rewinding modes. In any operation mode, a driving route from a motor to a reel receiver is effective to tend to continuously rotate the reel receiver. Upon stopping of the reel receiver by an end of a tape, a rockable member is rocked to and remains at a position at which rotation of an cam disk interposed in the driving route is stopped by the rockable member and then a releasing member on which the cam disk is mounted is pivoted to move the cam disk out of the driving route, thereby stopping rotation of the reel receiver. Upon such pivotal motion of the releasing member, an arresting member is moved away from a position in which an operation mode setting operating member is arrested to its arrested position, thereby allowing the operating member and the arresting member to return to respective home positions to cancel the set operation mode.

13 Claims, 16 Drawing Sheets

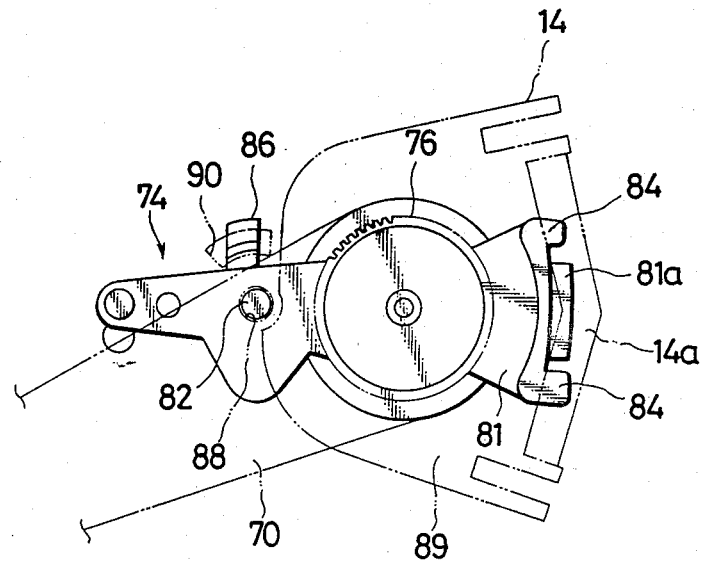
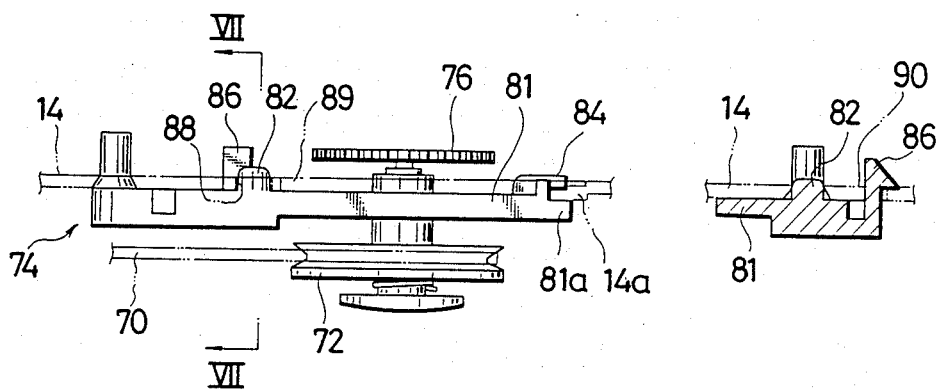
FIG. 6
FIG. 7

FIG. 20
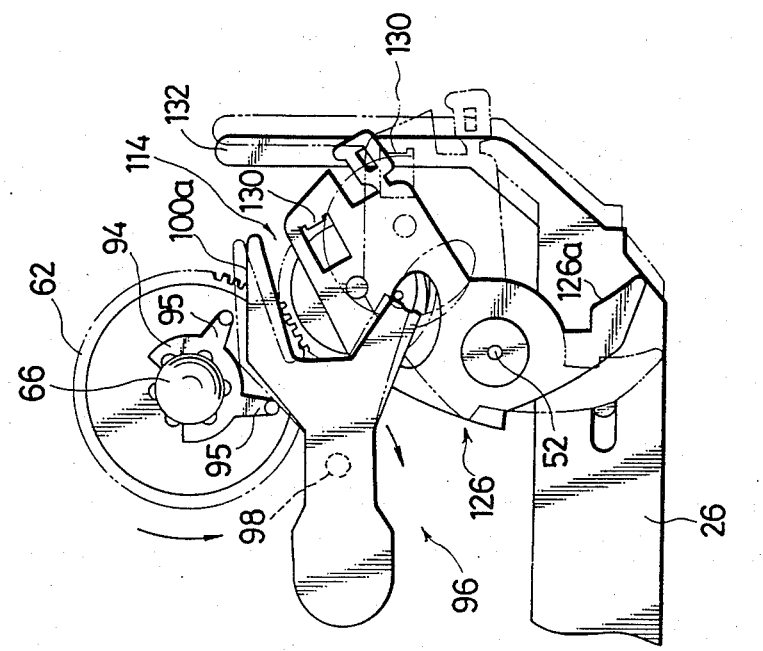
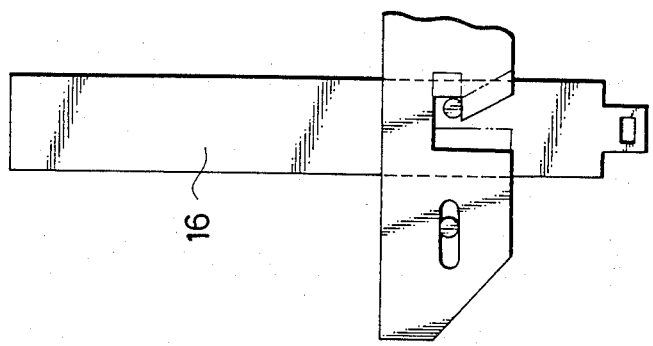

FIG. 23
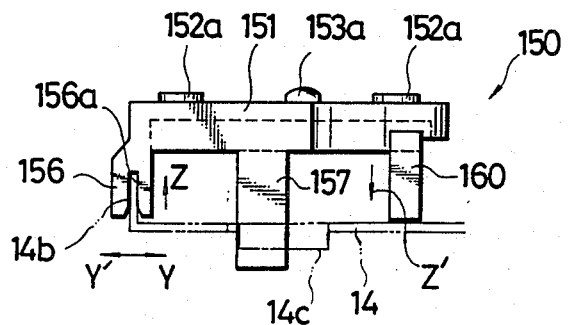
FIG. 24
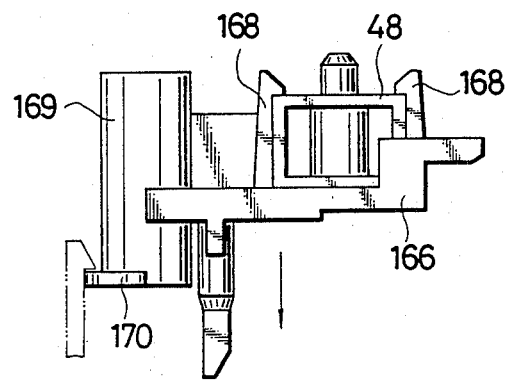
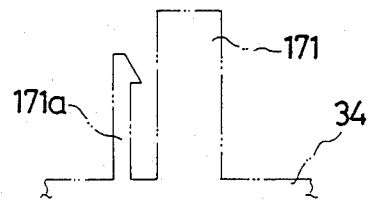
FIG. 25
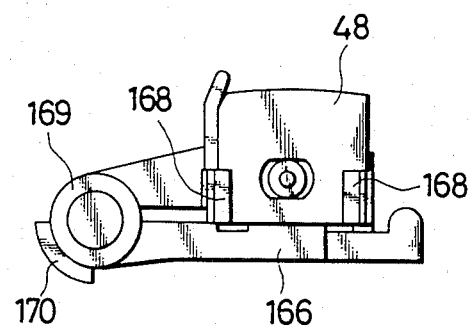

F I G. 35
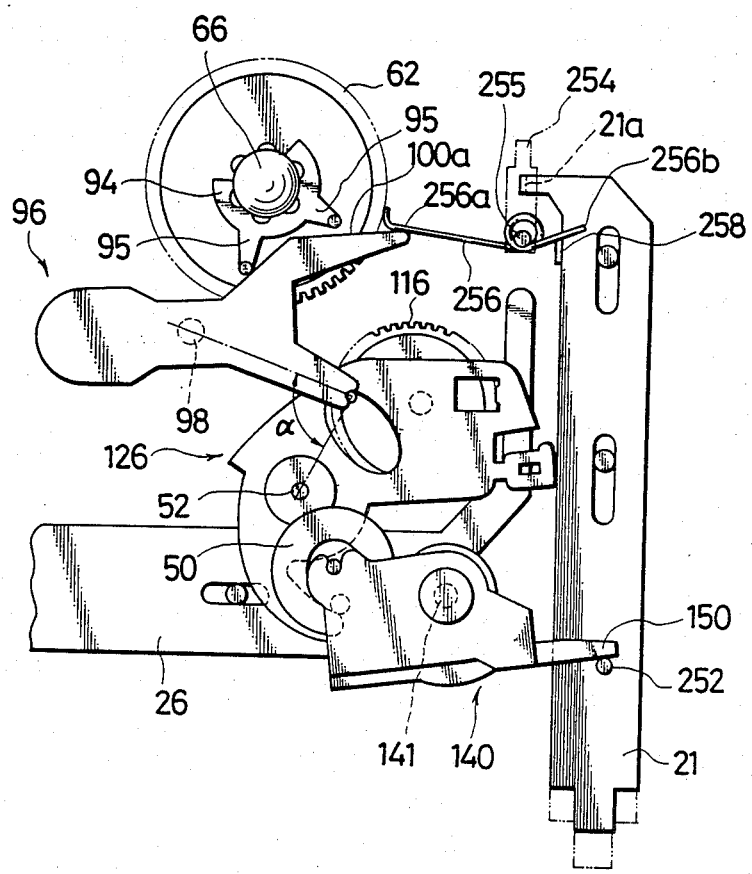

AUTOMATIC STOPPING MECHANISM FOR A TAPE FEEDING DEVICE

BACKGROUND OF THE INVENTION

1. Field of the Invention

This invention relates to an automatic stopping mechanism for a tape feeding device for detecting stopping of rotation of a reel receiver by an end of a tape to stop a tape driving source and return an operation mode setting operating member to its home position.

2. Description of the Prior Art

An automatic stopping mechanism for a tape feeding device such as, for example, a tape recorder or a VTR (video tape recorder) is already known wherein stopping of rotation of a reel receiver by an end of a tape is detected to release an operation mode of the tape feeding device such as a reproducing (PLAY) mode.

A conventional automatic stopping mechanism for a tape feeding device is designed to detect an end of a tape from a change in tension of the tape. In particular, a tape tension detecting arm (tension arm) is mounted on a support plate on which a magnetic head is supported. The tension arm presses at an end thereof against a magnetic tape and locally bends the tape while it is being fed.

In the reproducing (PLAY) mode or the recording (REC) mode, when a tape comes to its end, the tape is strained so that the tension thereof increases suddenly. Consequently, a portion of the tape which has been locally bent now tries to stretch itself straight to push the tension arm back to its inoperative home position. The movement of the tension arm then is utilized to stop a tape driving source or the like and allow an operating member for the reproducing mode or the like to return to its home position.

However, such a conventional automatic stopping mechanism wherein a tension arm is employed has following drawbacks:

At first, a tape is damaged readily because it is fed along a locally bent path while it is held pressed by the tension arm. Further, since the resistance to the tape being fed is increased by the tension arm, the force to contact a pinch roller with a capstan must necessarily be increased accordingly. However, increase of the contacting force of the pinch roller will cause a higher lateral pressure to act upon the capstan. Accordingly, the capstan must necessarily be mounted more firmly, which makes designing of bearing means for the capstan complicated.

Secondly, because a tape is fed along a locally bent path, such feeding of the tape is not stabilized, and such unstableness of feeding of the tape appears notably particularly at a join or the like of the tape. The unstableness of tape feeding has a significant influence on reproduction and recording characteristics so that it may become difficult to attain high performances of reproduction and recording of the tape feeding device because the tension arm is mounted on the support plate for the magnetic head and is thus located near the magnetic head.

Thirdly, since the tension arm is a movable member which moves in response to a change in tension of the tape, it is difficult to design the tension arm so that it may maintain a proper vertical position. Accordingly, the tension arm is not contacted uniformly over the entire width with the tape, and hence the tape may possibly be displaced laterally in a widthwise direction. Besides, the tape may possibly have a warping habit.

Fourthly, since the support plate remains at its home position and is not at an advanced position while the tape feeding device is in a fast feeding (FF) mode or a rewinding (REW) mode, the tension arm on the support plate remains at a position spaced away from the tape. Consequently, an end of the tape cannot be detected. Accordingly, in the fast feeding mode or the rewinding mode of the tape feeding device, an automatic stopping operation cannot be effected. Meanwhile, even if an alternate construction is employed wherein the tension arm is contacted with the tape also while the tape feeding device is in the fast feeding mode or the rewinding mode, because the feeding speed of the tape is high in the fast feeding or rewinding mode and the tape tension is high accordingly, it is to difficult to detect arrival of an end of the tape as critically distinct from a high speed feeding of the tape. Accordingly, such a conventional automatic stopping mechanism as described above cannot be employed for detection of an end of a tape while the tape deeding device is in the fast feeding mode or in the rewinding mode.

SUMMARY OF THE INVENTION

It is an object of the present invention to provide an automatic stopping mechaism for a tape feeding device which can detect an end of a tape not only when the tape feeding device is in a reproducing mode or recording mode but also when it is in a fast feeding mode or rewinding mode.

In order to attain the object, according to the present invention, an automatic stopping mechanism for a tape feeding device which includes a reel receiver, a reel base for rotating said reel receiver through frictional contact therebetween, a constantly rotating capstan, and means for selecting one of a plurality of operation modes in which said tape feeding device is to operate, comprises a mode maintaining element for cooperating with said means for selecting to maintain the selected operation mode of said tape feeding device, a cam disk connected to be rotated in one direction by said capstan and having thereon an eccentric cam face and an engaging element at a position spaced from said eccentric cam face, a rockable member mounted for rocking motion around a fixed axis and having a cam follower at a position thereof spaced from said fixed axis, a rotation detecting member mounted in frictional contact with said reel receiver for exerting an urging force in a direction of rotation of said reel receiver to urge said rockable member to contact said cam follower with said eccentric cam face of said cam disk so that said rockable member may be rocked by said eccentric cam face of said cam disk, and a movable releasing member supporting said cam disk for rotation thereon and movable between a neutral position and an operative position in which a driving force of said cam disk is transmitted in said reel base, said cam disk being located such that when rotation of said reel receiver is stopped and consequently said rockable member is pivoted to and thereafter remains at one of end positions of a range of rocking motion thereof until said engaging element of said cam disk is engaged with said cam follower of said rockable member, further rotation of said cam disk will cause said engaging element to be acted upon by a reactive force from said rockable member so that said movable releasing member will be moved away from said operative position farther than said neutral position thereby to cause said mode maintaining element to cancel the operation mode of said tape recorder.

The above and other objects, features and advantages of the present invention will become apparent from the following description and the appended claims, taken in conjunction with the accompanying drawings.

BRIEF DESCRIPTION OF THE DRAWINGS

FIGS. 5 and 6 are a plan view and a front elevational view, respectively, of an FF/REW change-over lever of the automatic stopping mechanism;

FIG. 7 is a cross sectional view taken along line VII—VII of FIG. 6;

FIG. 20 is a plan view, partially broken, illustrating operation of the automatic stopping mechanism.

FIG. 23 is a left-hand side elevational view of the motor bracket;

FIGS. 24 and 25 are a front elevational view and a plan view, respectively, of an erasing head lever;

FIGS. 34 and 35 are partial plan views of different positions of the automatic stopping mechanism with respect to a temporarily stopping (pause) operating member.

DESCRIPTION OF THE PREFERRED EMBODIMENT

Figure 1:
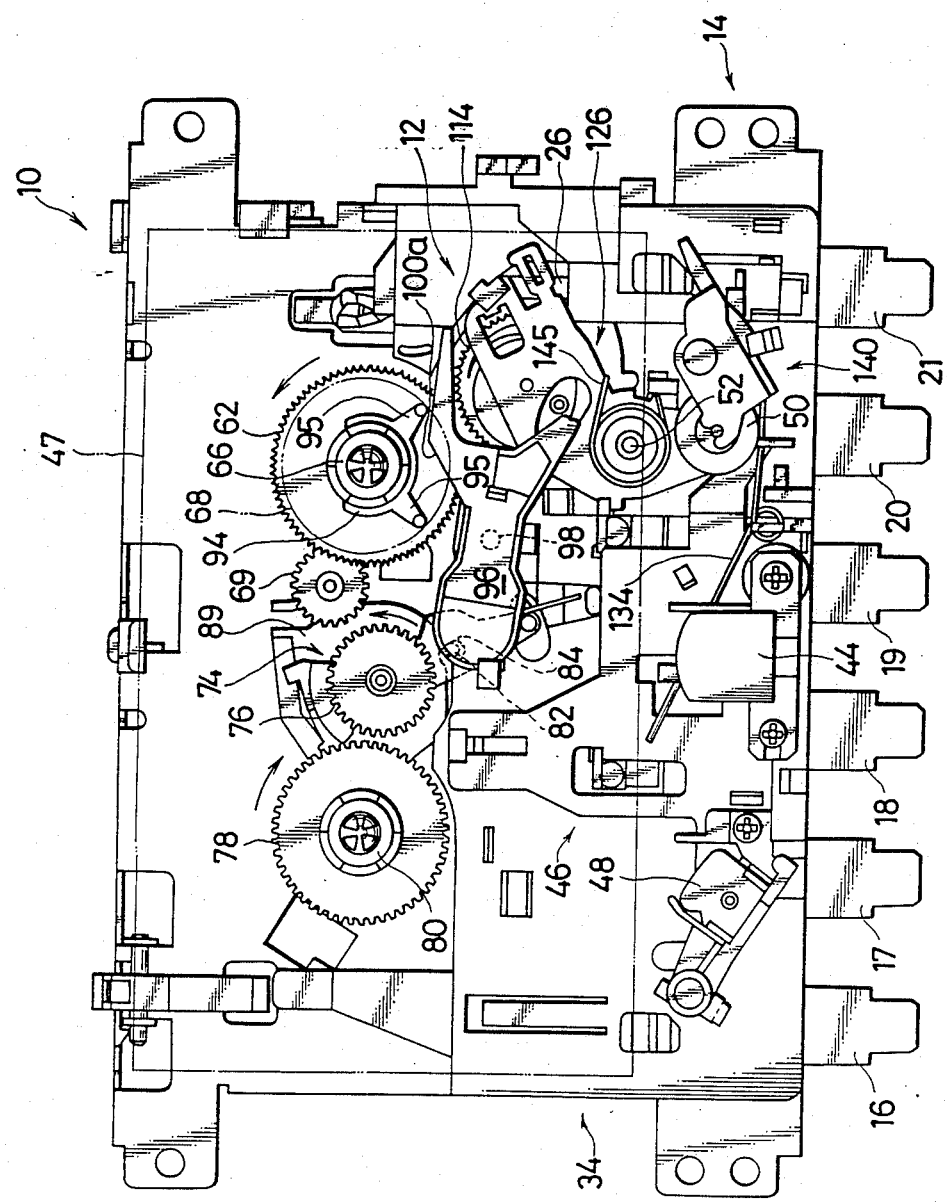
FIGS. 1 and 2 are a schematic top plan view and a schematic bottom plan view, respectively, showing a cassette tape recorder, with a top cover and a housing removed, in which an automatic stopping mechanism according to the present invention is incorporated.
Figure 2:
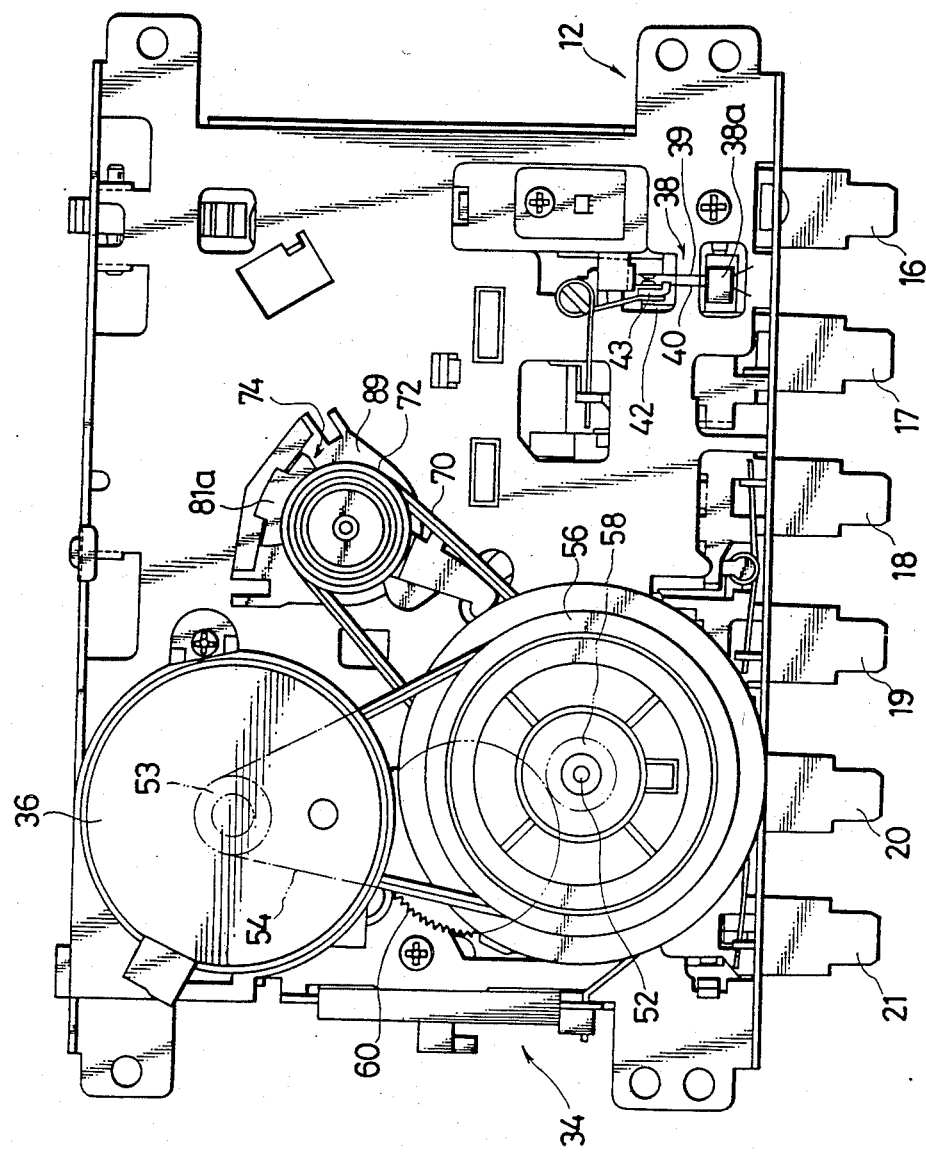

Referring first to FIGS. 1 and 2, a preferred embodiment of the present invention is shown wherein an automatic stopping mechanism 12 according to the present invention is incorporated in a tape feeding device in the form of a cassette tape recorder generally denoted at 10.

The cassette tape recorder 10 basically has a similar construction to that of conventional cassette tape recorders and includes a chassis 14 formed from a metal plate, and a plurality of, 6 for example, operating members 16, 17, 18, 19, 20 and 21 mounted at a front portion (lower portion in FIGS. 1 and 2) of the chassis 14 for individual longitudinal movement between a projected inoperative home position and an actuated or pushed in operative position. A push button not shown may suitably be secured to an end of each of the operating members 16 to 21 in order to facilitate manual pushing in operation of the latter. The four leftwardly located (in FIG. 1) operating members 16, 17, 18 and 19 are provided for operation to selectively set one of operation modes of the cassette tape recorder 10 including recording, reproducing, rewinding and fast feeding modes, respectively, while the operating member 20 is provided for operation to cancel a set one of the operation modes of the cassette tape recorder 10 and eject a tape cassette from the cassette tape recorder 10. The remaining operating member 21 is provided for operation to shift a pinch roller away from a capstan and temporarily stop (pause) operation of the cassette tape recorder 10 in any of the operation modes.

The operation mode setting operating members 16 to 19 have substantially like shapes to each other. Accordingly, description of construction will be given only of the reproducing operating member 17 as an example.

Figure 3:
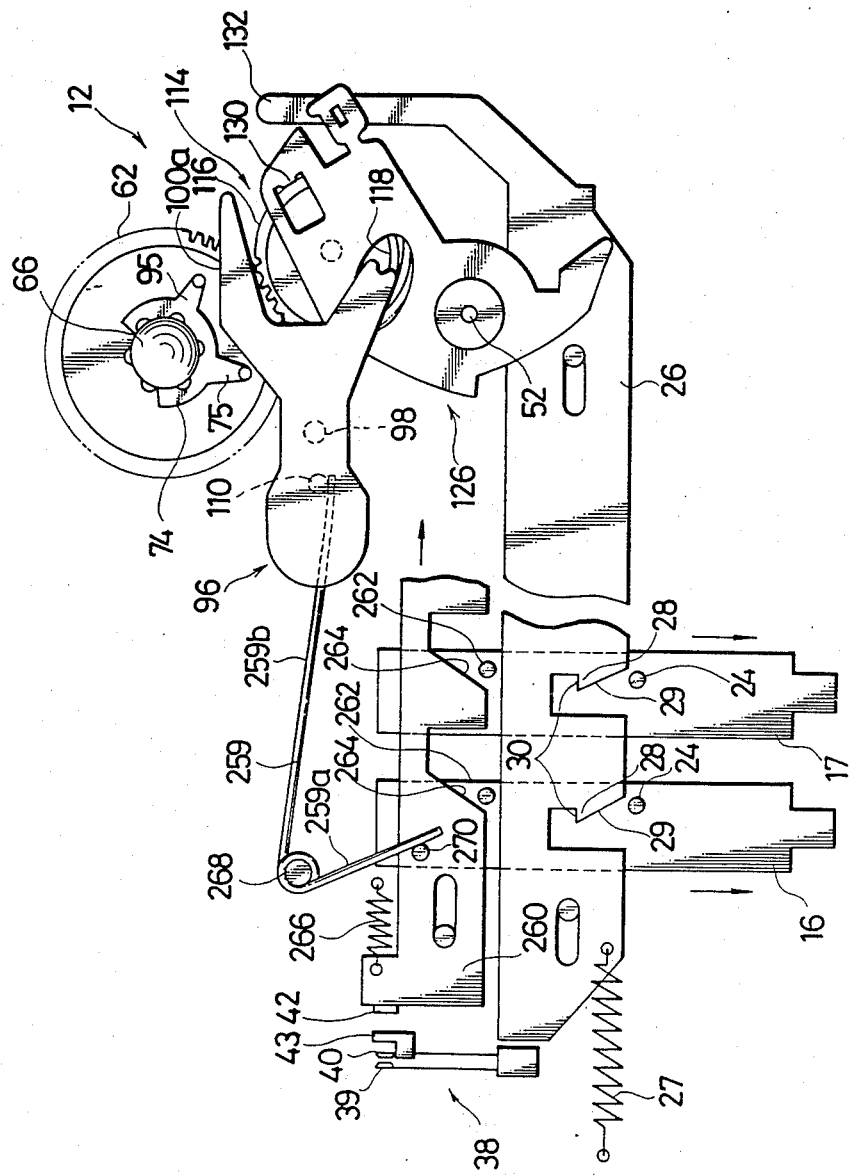
FIGS. 3 and 4 are enlarged plan views, partially broken, showing different positions of the automatic stopping mechanism.
Figure 4:
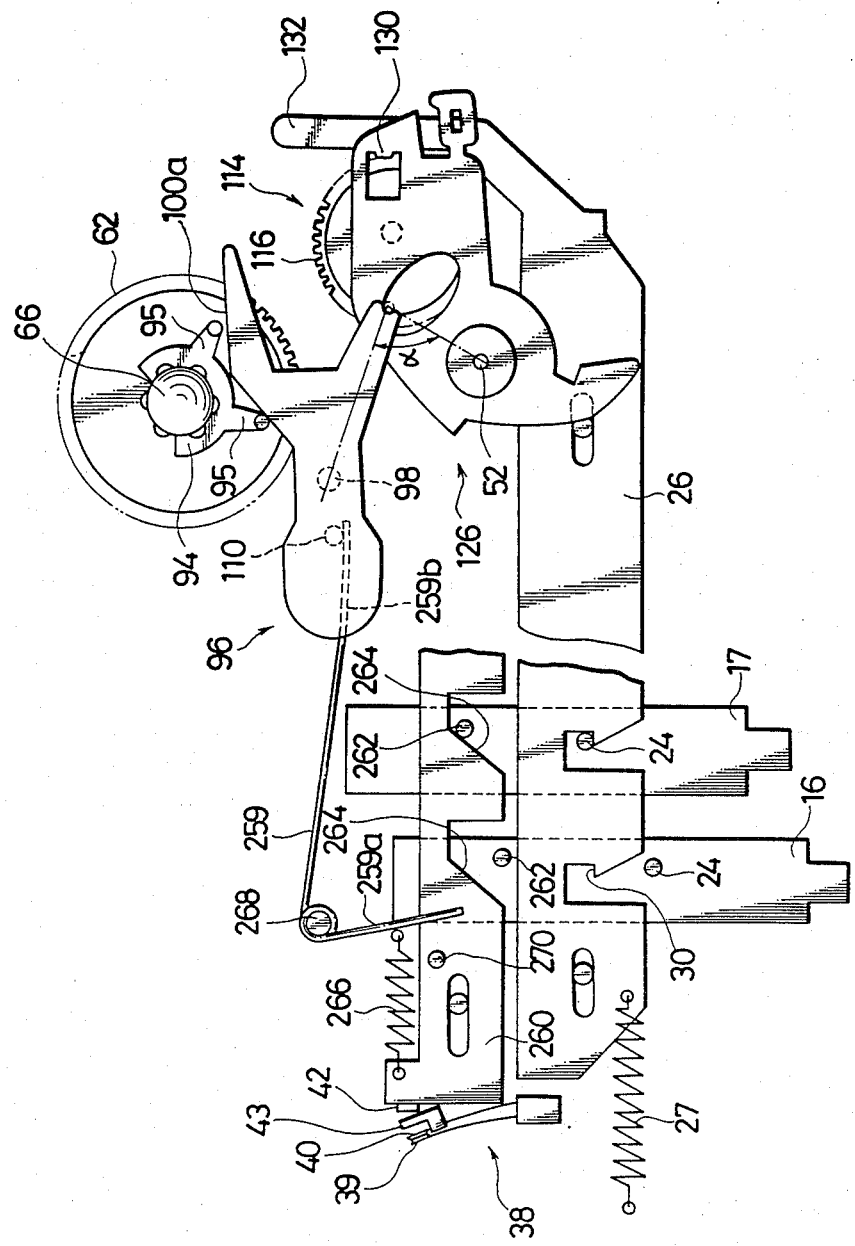

Referring now to FIG. 3, the operating member 17 has an engaging pin 24 on an upper face thereof and is normally urged in a direction indicated by an appended arrow mark by a return spring not shown. As the operating member 17 is pushed in in a longitudinal direction against the urging force of the return spring, the engaging pin 24 thereon is first engaged with an inclined face 29 of a corresponding one of hooks 28 formed on an arresting or mode maintaining member 26 which is normally urged in a direction indicated by an appended arrow mark (in a leftward direction) by a return spring 27. As the operating member 17 is further advanced, the engaging pin 24 pushes the inclined face 29 of the hook 28 to move the arresting member 26 in a direction opposite to the direction of the arrow mark, that is, in a rightward direction, against the urging force of the return spring 27. Then, finally as the engaging pin 24 climbs over a terminal end of the inclined face 29 to a rear face 30 of the hook 28, the arresting member 26 is moved back a little in the direction of the appended arrow mark by the urging force of the return spring 27 thereby to cut off the retreat of the engaging pin 24. Consequently, even after the force to push in the operating member 17 is removed, the operating member 17 is arrested to its actuated position as seen in FIG. 4 due to engagement of the engaging pin 24 on the operating member 17 with the rear face 30 of the hook 28.

Referring back to FIGS. 1 and 2, a base plate 34 molded from a plastics material is mounted on the chassis 14, and movable plate-formed members including the operating members 16 to 21 and the arresting member 26 are held for sliding movement between the chassis 14 and the base plate 34. A number of stops and guides for the movable plate-formed members are formed on a rear face of the base plate 34 through not all specifically shown in the drawings nor specifically mentioned herein. Meanwhile, a switch mount 38a is formed on the rear face of the base plate 34, and a switch 38 for switching a motor 36 which serves as a driving source of the tape recorder 10 is mounted on the switch mount 38a.

The switch 38 has a pair of resilient fingers 39, 40 made of a conductive material and extending below the chassis 14. Referring also to FIGS. 3 and 4, a piece 43 of a plastics material is secured to an end of the resilient finger 39 of the switch 38 and is located adjacent and in an opposing relationship to a bent lug 42 formed on an engaging member 260 such that the switch 38 may be controlled to turn on and off by the engaging member 260.

The engaging member 260 is located between the chassis 14 and the base plate 34 behind the arresting member 26 for sliding leftward and rightward movement in a direction parallel to the direction of movement of the arresting member 26. The engaging member 260 is normally urged by a return spring 266 in a direction indicated by an appended arrow mark in FIG. 3, that is, in the rightward direction, toward a home position in which the bent lug 42 thereof is spaced away from the piece 43 of the resilient finger 39 of the switch 38 as seen in FIG. 3 and accordingly the switch 38 is off. However, if the engaging member 260 is moved in the leftward direction against the urging force of the return spring 266 to an actuated position as shown in FIG. 2, the bent lug 42 of the engaging member 260 will press against the piece 43 of the resilient finger 40 of the switch 38 to contact the resilient finger 40 with the other resilient finger 39 thereby to turn the switch 38 on to start the motor 36. The engaging member 260 is also associated with the operating members 16 to 19 such that when any one of the latter is pushed in to its actuated position, the former may be slidably moved by the operating member. In particular, the engaging member 260 has four inclined faces 264 formed thereon for engagement with pressing pins 262 provided on the operating members 16 to 19 as particularly seen from FIG. 3. Accordingly, if any of the operating members 16 to 19, for example, the operating member 17, is pushed in to its actuated position, the pressing pin 262 thereon will be engaged with the opposing inclined face 264 of the engaging member 260 to move the engaging member 260 leftwardly from its home position as shown in FIG. 3 to its actuated position as shown in FIG. 4 whereupon the switch 38 for the motor 36 is turned on as described above. Then, when the operating member 17 is returned from its actuated position to its home position, the engaging member 260 is moved in the rightward direction in FIG. 4 back to its home position by the urging force of the return spring 266. Thereupon, the bent lug 42 of the engaging member 260 is spaced away from the piece 43 on the resilient finger 43 to allow the resilient finger 39 to bring itself out of contact with the other finger 39 due to its own resiliency thereby to turn the switch 38 off to stop the motor 36.

Referring again to FIG. 1, a support plate 46 on which a recording/reproducing magnetic head 44 is mounted is in turn mounted for sliding movement on the base plate 34. The support plate 46 is associated with the reproducing operating member 17 such that as the latter is pushed in toward its actuated position, the former may be moved by the latter in an upward direction in FIG. 1. Meanwhile, the recording operating member 16 is associated with the reproducing operating member 17 such that as the former is pushed in to its actuated position, the latter may be moved to its actuated position by the former. Accordingly, when either the recording operating member 16 or the reproducing operating member 17 is manually pushed in to its actuated position, the support plate 46 is moved by the operating member 17 in an upward direction in FIG. 1. Such upward movement of the support plate 46 in FIG. 1 will bring the magnetic head 44 into contact with a tape within a cassette loaded in position in the cassette tape recorder 10.

An erasing head 48 is mounted for pivotal motion around a shaft 49 on the base plate 34. As the recording operating member 16 is pushed in to its actuated position, the erasing head 48 is also moved to an actuated position in which it contacts with a tape of a cassette loaded in position, and also a pinch roller 50 on a pinch roller lever 140 mounted for pivotal motion on the base plate 34 is pivoted to an actuated position in which it cooperates with a capstan 52 to hold a tape therebetween.

Thus, when the recording operating member 16 or the reproducing operating member 17 is pushed in to its actuated position as described above, the magnetic head 44 and the pinch roller 50 are moved to the respective predetermined actuated positions while the switch 38 for the motor 36 is turned on by the engaging member 260 via the arresting member 26 to start the motor 36 thereby to set the cassette tape recorder 10 to a desired recording or reproducing mode. When the recording operating member 16 is pushed in to is actuated position, also the erasing head 48 is moved to its actuated position.

Also when the rewinding operating member 18 or the fast feeding operating member 19 is pushed in to its actuated position, it is arrested to its actuated position by the arresting member 26 due to engagement of the pin 24 thereon with the rear face 30 of the hook 28 of the latter though not specifically shown in FIG. 3 or 4. When one of the operating members 16 to 19 is pushed in to its actuated position to move the arresting member 26 in the rightward direction in FIG. 3, any other operating member 16, 17, 18 or 19 which has been arrested to its actuated position, if any, is released from its arrested condition by the associated hook 28 of the arresting member 26 and consequently returned to its home position by the associated return spring.

On the other hand, when the stopping and ejecting operating member 20 is manually pushed in to its actuated position while the cassette tape recorder is in one of the recording, reproducing, fast feeding and rewinding operation modes, the arresting member 26 is moved in the rightward direction in FIG. 3 to allow any of the operation mode setting operating members 16 to 19 in its actuated position to be returned to its home position by the associated return spring. Then, when the stopping and ejecting operating member 20 is released from manual operation, it is returned to its home position by the associated return spring because the corresponding hook 28 of the arresting member 26 is not provided with such a rear face 30 for arresting the operating member 20 to its actuated position though not specifically shown in FIG. 3 or 4. As the stopping and ejecting operating member 20 is returned to its home position, the arresting member 26 is moved in the direction of the appended arrow mark (in the leftward direction) in FIG. 3 back to its home position by the return spring 27. Further, when any of the operating members 16 to 19 is returned from its actuated position to its home position by the associated return spring so that no operating member is arrested to its actuated position any more, the engaging member 260 is returned to its home position by the return spring 266 thereby to turn the switch 38 off as described above. It is to be noted that if the stopping and ejecting operating member 20 is pushed in to its actuated position when the cassette tape recorder 10 is not in any of the operation modes, an ejecting mechanism not shown is caused to operate thereby so that a tape cassette may be ejected to allow removal thereof from the cassette tape recorder 10.

As described hereinabove, the movable plate-formed members including the operating members 16 to 21 and the arresting member 26 are positioned relative to the chassis 14 by the stops and guides formed on the rear face of the base plate 34. Accordingly, if the movable plate-formed members 16 to 21, 26 and so on are at first placed in position on the rear face of the base plate 34 and then the chassis 14 is placed in position on and secured to the base plate 34, they are mounted for sliding movement between the chassis 14 and the base plate 34. Such assembly of the operating members 16 to 21, arresting member 26 and so on to the chassis 14 does not at all necessitate a fastening element such as a screw in an assembling step, and accordingly the number of man-hour for such assembly can be reduced significantly. Consequently, assembling operation can be performed rapidly and readily, and automation of assembly can be facilitated.

Referring now to FIG. 2, a driving force of the motor 36 is transmitted from a motor pulley 53 to a capstan pulley 56 by way of an endless belt 54. In addition to the capstan pulley 56, a pinion gear 58 is mounted on the capstan 52, and an intermediate gear 60 is meshed with the pinion gear 58. As described hereinbelow, the intermediate gear 60 is securely mounted on a shaft 120 of a cam disk 114, and while the cassette tape recorder 10 is in the recording or reproducing mode, the intermediate gear 60 is in mesh with a take-up side reel gear 62 (FIG. 1) so that the driving force of the motor 36 is transmitted to the reel gear 62.

Referring back to FIG. 1, the reel gear 62 is mounted for rotation on a shaft (not shown) securely mounted on the chassis 14 and serves also as a reel base. Naturally, a reel base may otherwise be provided independently of the reel gear 62 together with a means for transmitting a driving force therebetween. Meanwhile, a reel receiver 66 adapted to receive a reel hub of a tape cassette 47 is fitted on the reel gear 62 such that it may be rotated by the reel gear 62 due to frictional contact therebetween. By such rotation of the reel receiver 66 in a counterclockwide direction in FIG. 1, a tape within the cassette 47 will be wound on a take-up reel in the cassette 47 without slackening. Another gear 68 having a diameter a little smaller than the reel gear 62 is securely mounted at a lower end of the reel receiver 66 below the reel gear 62 and is meshed with an idler gear 69 mounted on the chassis 14. Accordingly, a driving force transmitted to the reel gear 62 is then transmitted to the reel receiver 66 and the gear 68 via frictional contact between the reel gear 62 and the reel receiver 66. Here, such frictional contact between the reel gear 62 and the reel receiver 66 may be attained by suitable known friction plates such as felt plates and so on.

Referring to FIG. 2, a driving force of the motor 36 transmitted to the capstan pulley 56 is further transmitted to a fast feeding and rewinding pulley 72 by way of another endless belt 70. The pulley 72 is mounted for rotation on a lower face of an FF/REW (fast feeding-/rewinding) change-over lever 74. Meanwhile, as seen in FIG. 1, a gear 76 is mounted on an upper face of the change-over lever 74 in a coaxial relationship and in frictional contact with the pulley 72 so that it may be rotated in a counterclockwise direction in FIG. 1 at a high speed by the pulley 72. The change-over lever 74 is associated with the rewinding operating member 18 and the fast feeding operating member 19 such that as the member 18 or 19 is pushed in to its actuated position, the change-over lever 74 may be rocked by the member 18 or 19 in a counterclockwise or clockwise direction in FIG. 1, respectively. In particular, as the rewinding operating member 18 is pushed in, the change-over lever 74 is rocked in the counterclockwise direction in FIG. 1 to bring the gear 76 thereon into meshing engagement with a reel gear 78, which also serves as a supply side reel base, so that a supply side reel receiver 80 is rotated at a high speed in a clockwise direction to effect rewinding of the tape. On the other hand, as the fast feeding operating member 19 is pushed in, the change-over lever 74 is rocked in the clockwise direction to bring the gear 76 thereon into meshing engagement with the idler gear 69 so that the reel receiver 66 is rotated at a high speed via the idler gear 69 to effect fast feeding of the tape.

The FF/REW change-over lever 74 can be assembled by a simple operation without using a screw. Referring to FIGS. 5 to 7, the change-over lever 74 is formed by molding from a plastics material and integrally has a shaft 82 extending from an upper face of a body 81, a pair of tongues 84 in the form of a fork at an end of the body 81, an extension 81a formed at the same end of the body 81 between the tongues 84 and offset from the tongues 84 in a direction of the thickness of the body 81 as seen in FIG. 6, and a hooked finger 86 formed at a side of the body 81. The change-over lever 74 having the construction just described is assembled to the chassis 14 without using a fastening screw in following steps. At first, the change-over lever 74 is partially inserted into an opening 89 (refer to FIGS. 1, 2 and 5) formed in the chassis 14 from below the chassis 14 until an edge 14a of the chassis 14 adjacent the opening 89 is received between the extension 81a and the tongues 84 of the body 81 of the change-over lever 74 as seen in FIG. 6. Then, the shaft 82 of the body 81 is registered with a mounting hole 88 formed in the chassis 14, and the change-over lever 74 is pushed up until the shaft 82 is fitted into the mounting hole 88. In this instance, an inclined face at an end of the hooked finger 86 of the body 81 is slidably engaged with an edge of another opening 90 formed in the chassis 14 while resiliently deforming the hooked finger 86 until the hooked end of the finger 86 is projected upwardly from the upper face of the chassis 14 whereupon the hooked finger 86 is resiliently returned to its original position so that the hooked end of the finger 86 is engaged with and stopped by an upper face of the edge of the chassis 14 adjacent the opening 90 to prevent the change-over lever 74 from being removed from the chassis 14, thereby completing assembly of the change-over lever 74 to the chassis 14.

The assembly just described eliminates fastening by a screw and can be done by a simple operation. Here, the chassis 14 is held between an upper face of the body 81 of the change-over lever 74 and the hooked end of the finger 86 of the body 81 as seen in FIG. 7. Accordingly, the change-over lever 74 is supported on the chassis 14 for rocking motion around an axis of the shaft 82 without being removed laterally in a vertical direction. Besides, since the edge 14a of the chassis 14 is held between the extension 81a and the tongues 84 of the change-over lever 74, the change-over lever 74 is prevented from being rocked laterally in a vertical direction, which assures smooth rocking movement of the change-over lever 74 around the shaft 82.

In order to urge the change-over lever 74 in one direction, a conventional construction would employ a spring such as a tension coil spring extending between the change-over lever 74 and the chassis 14. However, in the present embodiment, tension of the endless belt 70 is used to exert an urging force in a clockwise direction to the change-over lever 74 as seen in FIG. 5. In particular, as the pulley 72 is rotated by the endless belt 70, slight friction between the pulley 72 and the change-over lever 74 urges the change-over lever 74 in the same direction with the pulley 72. Consequently, a spring for exerting an urging force to the change-over lever 74 is omitted, which allows reduction in number of parts and simplification of a step to assemble the change-over lever 74.

It is to be noted that operation of the change-over lever 74 itself is similar to that of a conventional construction. In particular, referring to FIG. 1, when neither the rewinding operating member 18 nor the fast feeding operating member 19 is pushed in, the change-over lever 74 assumes a neutral position in which the gear 76 thereon does not mesh with any of the idler gear 69 and the supply side reel gear 78 as seen in FIG. 1. However, if the fast feeding operating member 19 is pushed in to its actuated position, a stopper thereon not shown which normally prevents a rocking motion of the change-over lever 74 is retracted to allow the change-over lever 74 to be rocked in the clockwise direction by an urging force of the endless belt 70. Consequently, the gear 76 on the change-over lever 74 is meshed with the idler gear 69 so that the winding side reel receiver 66 is rotated in the counterclockwise direction at a high speed to feed a tape fast. On the other hand, if the rewinding operating member 18 is pushed in to its actuated position, the change-over lever 74 is pressed and rocked in the counterclockwise direction by a rear end of the operating member 18 against the urging force of the endless belt 70. Consequently, the gear 76 on the change-over lever 74 is now meshed with the supply side reel gear 78 so that the supply side reel receiver 80 is rotated in the counterclockwise direction at a high speed to rewind a tape.

Figure 8:
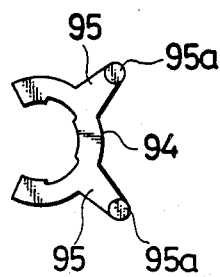
FIGS. 8 and 9 are a plan view and a front elevational view, respectively, of a rotation detecting member.
Figure 9:
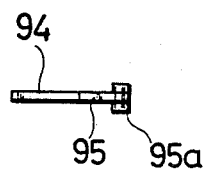

Referring to FIG. 1, the automatic stopping mechanism 12 includes a rotation detecting member 94 for detecting a direction of rotation of the reel receiver 66. Referring also to FIGS. 8 and 9, the rotation detecting member 94 in the embodiment is molded from a plastics material into a partial ring-shaped body having a pair of arms 95 and is resilient enough to be snapped and fitted around an outer periphery of the reed receiver 66 from a side. here, The rotation detecting member 94 is mounted for rotation in any of clockwise and counterclockwise directions on the reel receiver 66 but is normally urged in a direction of rotation of the reel receiver 66 due to frictional contact with the reel receiver 66. Each of the arms 95 of the rotation detecting member 94 has integrally formed at an end thereof a pin 95a for pressing against a rockable member which will be hereinafter described. It is to be noted that while the cassette tape recorder 10 is in the rewinding mode, the reel receiver 66 is rotated in the clockwise direction in FIG. 1 by tension of a tape being rewound, but otherwise while the cassette tape recorder is in any other operation mode, that is, in the recording, rewinding or fast feeding mode, a driving force of the motor is transmitted to rotate the reel receiver 66 in the counterclockwise direction.

Figure 10:
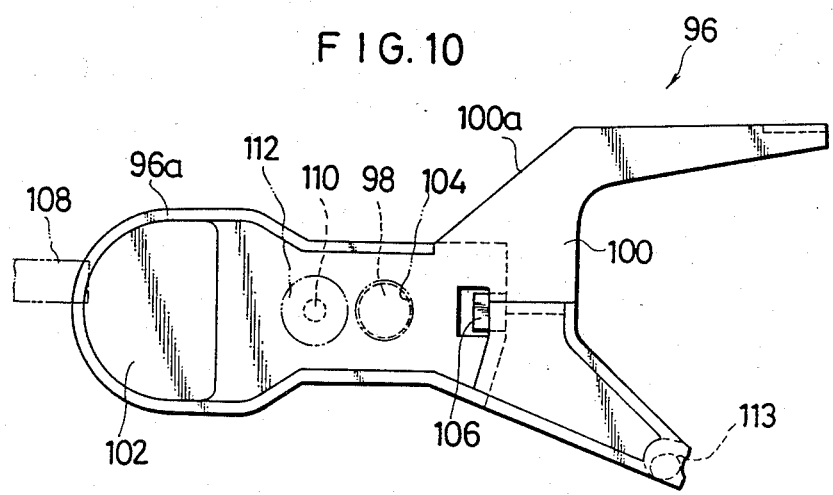
FIGS. 10 and 11 are a plan view and a front elevational view, respectively, of a rockable member.
Figure 11:
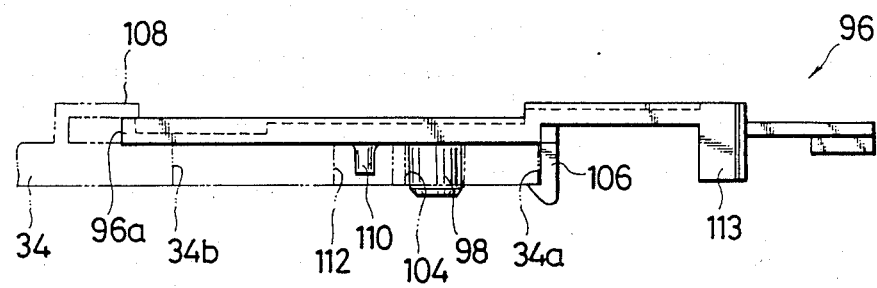

Referring now to FIGS. 1, 10 and 11, the automatic stopping mechanism 12 further includes a rockable member 96 formed by molding, for example, of a plastics material and having a shaft 98 formed at a central position on a lower face thereof, a forked portion 100 formed at an end, and a weight portion 102 formed at the other end thereof. The rockable member 96 is mounted for rocking motion on the base plate 34 around an axis of the shaft 98 fitted in a mounting hole 104 formed in the base plate 34 and is normally urged in a clockwise direction by a turning force of the rotation detecting member 94 while the reel receiver 66 is rotating in any of the clockwise and counterclockwise directions. Here, the rockable member 96 is designed such that the shaft 98 may be located substantially at a position of the center of gravity of the rockable member 98 by suitable provision of the weight portion 102 at the left end of the rockable member 96. Consequently, the rockable member 96 is well balanced with respect to the shaft 98 thereof so that, in whichever posture the cassette tape recorder 10 is used, the rockable member 96 will always maintain a stabilized posture. The rockable member 96 further has a hooked finger 106 formed thereon which extends downwardly until a hooked end thereof engages with an edge 34a of the base plate 34 to prevent the rockable member 96 from being removed upwardly from the base member 34 as seen in FIG. 11 and assure smooth rocking movement of the rockable member 96. The rockable member 96 additionally has an engaging pin 110 formed on a lower face of the weight portion 102 thereof and extending downwardly through a round hole 112 formed in the base plate 34 so that a range of rocking motion of the rockable member 96 is defined or limited by opposite portions of an edge of the round hole 112 which are to be abutted with the engaging pin 110.

The rockable member 96 is assembled to the base plate 34 in a following procedure. At first, while an end portion 96a of the weight portion 102 of the rockable member 96, that is, a left end portion of the rockable member 96 in FIGS. 10 and 11, is being inserted between an upper face of the base plate 34 and an L-shaped holding finger 108 formed on the base plate 34, the rockable member 96 is pushed down with the shaft 98 and the engaging pin 110 registered with the mounting hole 104 and the round hole 112, respectively, in the base plate 34 so that the shaft 98 and the engaging pin 110 are fitted into the mounting hole 104 and the round hole 112, respectively. In this instance, the hooked finger 106 of the rockable member 96 is yieldably deformed by the edge 34a of the base plate 34 due to resiliency of the hooked finger 106 and the presence of an inclined face at the end of the hooked finger 106 until the hooked end thereof reaches a rear face of the base plate 34 whereupon the hooked finger 106 is resiliently returned to its original position to engage with the edge 34a of the base plate 34, thereby completing assembly of the rockable member 96 to the base plate 34. The assembly just described eliminates fastening by a screw and can be done rapidly and readily by a simple operation. Here, the left end portion 96a of the rockable member 96 has a thickness a very little greater than a gap left between the L-shaped holding finger 108 and the upper face of the base plate 34 so that, when it is inserted into the gap, the holding finger 108 is resiliently deformed a little by it. Consequently, the left end portion 96a of the rockable member 96 is nipped very lightly between the base plate 34 and the holding finger 108 so that the rockable member 96 is prevented from inadvertently moving in a lateral direction due to frictional contact thereof with the base plate 34 and the holding finger 108 while it is allowed to make a rocking motion around the shaft 98.

The rockable member 96 further has formed at an end of the forked portion 100 thereof a cam follower or slidably engaging projection 113 for slidably engaging with an eccentric cam face 118 which will be hereinafter described.

Referring to FIG. 1, the rotation detecting member 94 is mounted on the reel receiver 66 such that the pair of arms 95 thereof may be opposed to an inverted V-shaped edge 100a of the forked portion 100 of the rockable member 96. Thus, when the reel receiver 66 is rotated, the rotation detecting member 94 is urged in the same direction with the the reel receiver 66 so that either one of the pins 95a at the ends of the arms 95 of the rotation detecting member 94 will be contacted with and press against the edge 100a of the rockable member 96. In particular, when the reel receiver 66 is rotated in the counterclockwise direction (in the recording, reproducing or fast feeding mode of the cassette tape recorder 10) as seen in FIG. 1, the rotation detecting member 94 is urged in the counterclockwise direction so that the rockable member 96 is pressed by the left one (in FIG. 1) of the pins 95a on the rotation detecting member 94 and rocked thereby in the clockwise direction around the shaft 98. On the other hand, when the reel receiver 66 is rotated in the clockwise direction while the cassette tape recorder 10 is in the rewinding mode, the rotation detecting member 94 is also urged in the clockwise direction so that the rockable member 96 is now pressed by the other right (in FIG. 1) pin 95a and rocked thereby likewise in the clockwise direction. In this manner, the rockable member 96 is rocked only in the clockwise direction in whichever direction the reel receiver 66 is rotated.

It is to be noted that while in the present embodiment the pair of arms 95 are provided on the rotation detecting member 94 in order to urge the rockable member 96 always in a fixed one direction irrespective of a direction of rotation of the reel receiver 66, an alternative construction may naturally be employed. For example, it may be recommended to form in a rockable member a V-shaped recess having oppositely tapered faces while a single arm is formed on a rotation detecting member and a pin on the single arm is positioned within the V-shaped recess of the rockable member. With the construction just described, if the rotation detecting member is urged and rotated by a reel receiver, the pin on the arm thereof will be contacted with and press against either the left or the right tapered face of the V-shaped recess of the rotation detecting member to rock the rotation detecting member in a fixed one direction irrespective of the direction of rotation of the reel receiver.

Figure 12:
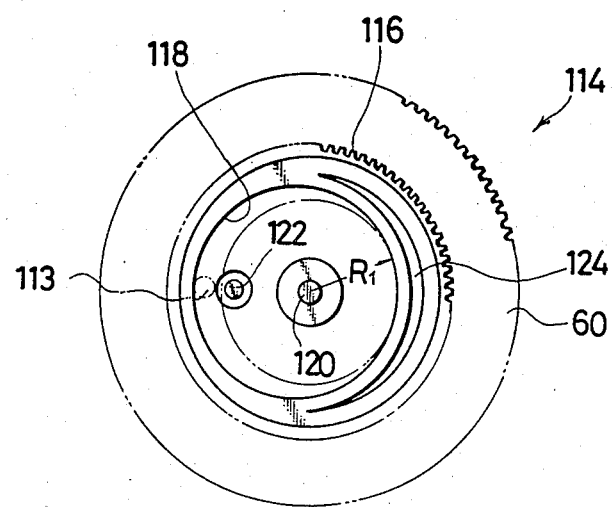
FIGS. 12 and 13 are a plan view and a front elevational view, respectively, of a cam disk.
Figure 13:
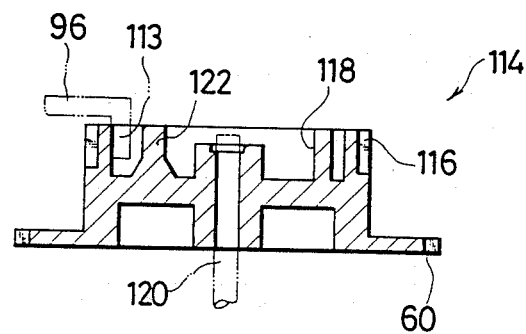

Referring now to FIGS. 12 and 13, the aforementioned intermediate gear 60 (refer to FIG. 2) is formed in a coaxial relationship on a lower face of a cam disk 114. The cam disk 114 has another gear 116 formed on an outer periphery thereof for meshing engagement with the reel gear 62 (refer to FIG. 1) and an annular eccentric cam face 118 formed on an inner periphery of a recessed portion in an upper wall of the cam disk 114. An engaging projection 122 is formed at a position of the recessed portion of the cam disk 114 inwardly of and opposing to a maximum distance providing portion of the eccentric cam face 118 and is spaced apart from the shaft 120 providing the center of rotation of the dam disk 114 by a distance a little smaller than a minimum distance R1 provided by the eccentric cam face 118. The cam disk 114 is made of a plastics material and has, in the embodiment shown, a crescent-shaped groove 124 formed therein in order to prevent a sink or shrink mark from appearing when it is cooled after molding. It is to be noted that because the intermediate gear 60 is formed in an integral relationship with the cam disk 114, the cam disk 114 is rotated together with the intermediate gear 60 by a driving force of the motor 36 transmitted to the intermediate gear 60. While the cassette tape recorder 10 is in the recording or reproducing mode, the driving force of the cam disk 114 is transmitted to the reel gear 62 via the gear 116 of the cam disk 114 to continuously rotate the reel receiver 66 in the counterclockwise direction.

It is to be noted that the cam disk 114 must only be rotated by a driving force from the motor 36 and may not always be formed as an integral member with the intermediate gear 60. Further, while in the present embodiment the eccentric cam face 118 is formed as an inner peripheral cam of the recessed portion in the top wall of the cam disk 114, it is not limited to the specific construction and may otherwise be formed, for example, as an outer peripheral cam on the top wall of the cam disk.

Figure 14:
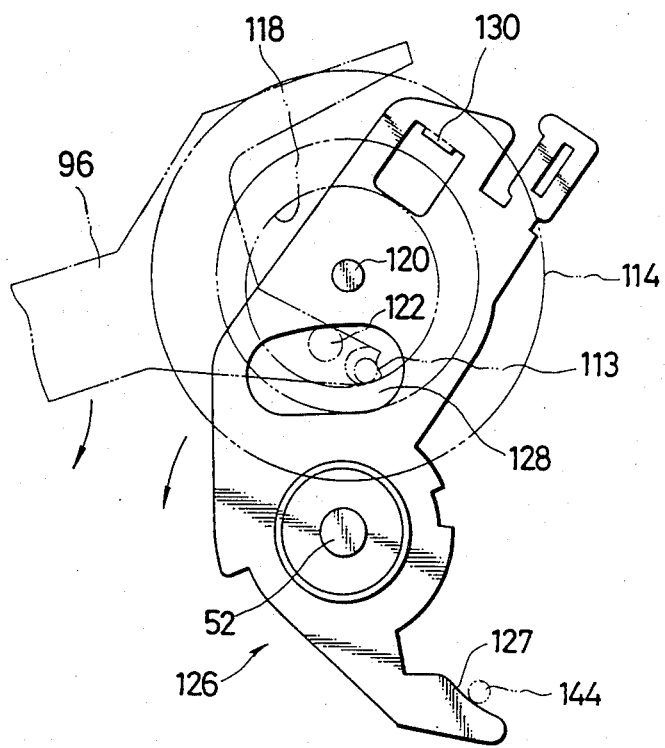
FIG. 14 is a plan view of a gear plate.

The shaft 120 on which the cam disk 114 is supported is mounted on a lower face of a gear plate 126 which serves as a releasing member. Referring to FIG. 14, the gear plate 126 is mounted on the base plate 34 for pivotal motion around the capstan 52 and has an elongated hole 128 formed therein. The slidably engaging portion 113 of the rockable member 96 extends downwardly through the elongated hole 128 of the gear plate 126 to a level of the eccentric cam face 118 of the cam disk 114. While the rockable member 96 is urged in the clockwise direction by the rotation detecting member 94, the slidably engaging portion 113 of the rockable member 96 is slidably engaged with the eccentric cam face 118 of the cam disk 114. The gear plate 126 has a downwardly bent pressing lug 130 formed thereon and normally located leftwardly of an in an opposing relationship to an extension 132 (refer to FIGS. 3 and 4) provided at a right-hand end of the arresting member 26.

The gear plate 126 on which the cam disk 114 is supported is normally held to a neutral position in which the gear 116 of the cam disk 114 thereon does not mesh with the reel gear 62 (refer to FIG. 1). When either the recording operating member 16 or the reproducing operating member 17 is pushed in to move the magnetic head support plate 46 to its actuated position, the gear plate 126 is rocked in the counterclockwise direction in FIG. 1 to an operative position in which the gear 116 of the cam disk 114 thereon is meshed with the reel gear 62.

To this end, the gear plate 126 in the embodiment shown is associated with the support plate 46 via the pinch roller lever 140 in such a manner as described below.

Figure 15:
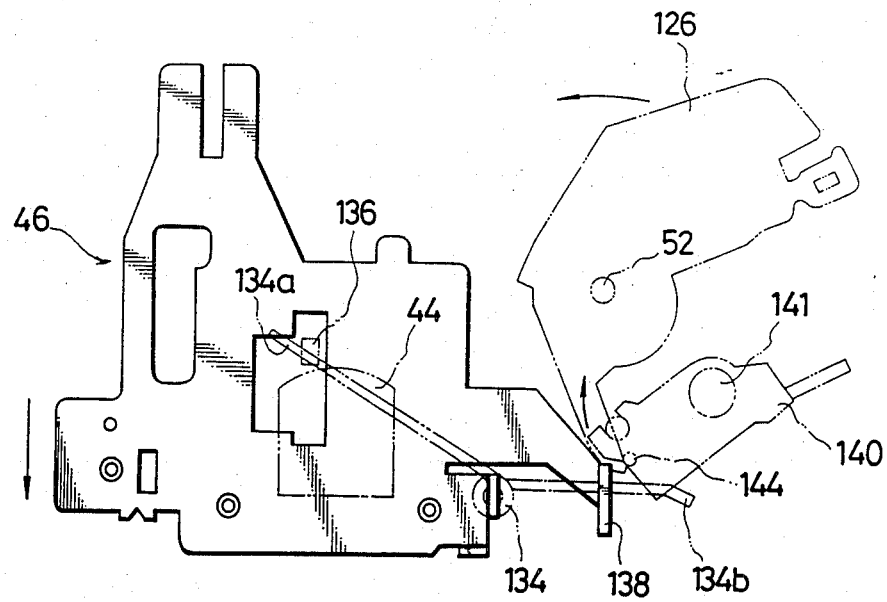
FIG. 15 is a plan view of a support plate for a magnetic head.
Figure 16:
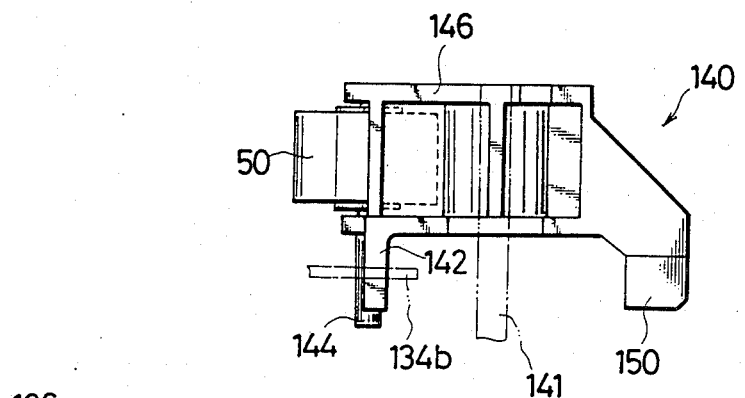
FIGS. 16, 17 and 18 are a front elevational view, a plan view and a left-hand side elevational view, respectively, of a pinch roller lever.

In particular, referring to FIGS. 1 to 15, a torsion spring 134 is mounted on the support plate 46. The torsion spring 134 has one end 134a thereof arrested by an arresting piece 136 provided on the base plate 34 and the other end 134b thereof arrested by another arresting piece 138 at a right end of the support plate 46. Consequently, the support plate 46 is urged in a direction indicated by an appended arrow mark in FIG. 15, that is, in a direction toward an unactuated position (home position), by the torsion spring 134. The other end 134b of the torsion spring 134 arrested by the arresting piece 138 at the right end of the support plate 46 further extends beyond the arresting piece 138 and engages with the pinch roller lever 140.

Referring now to FIGS. 16 to 19, the pinch roller lever 140 has a downwardly extending arresting piece 142 in which the other end 134b of the torsion spring 134 is received. It is to be noted that the other end 134b of the torsion spring 134 is bent outwardly so that it may not readily be disengaged from the arresting piece 142 of the pinch roller lever 140 (refer to FIG. 17). The pinch roller lever 140 further has pin 144 located on and extending downwardly from a lower face thereof. The pin 144 of the pinch roller lever 140 is normally contacted by a cam face 127 formed on an edge of the gear plate 126 as seen in FIG. 14 as the gear plate 126 is normally urged in a counterclockwise direction by a torsion spring 145 wrapped around the capstan 52 (refer to FIG. 1).

The support plate 46, the pinch roller lever 140 and the gear plate 126 are associated in such a manner as described above with one another. Accordingly, as the operating member 16 or 17 is pushed in to move the support plate 46 in the direction opposite to a direction of the appended arrow mark in FIG. 15, the pinch roller lever 140 is pushed to pivot in the clockwise direction around a shaft 141 by the other end 134b of the torsion spring 134. By such pivotal motion of the pinch roller lever 140, the pinch roller 50 on the pinch roller lever 140 is pressed against the capstan 52 to hold a tape therebetween. Meanwhile, as the pinch roller lever 140 is pivoted in the clockwise direction, the pin 144 on the pinch roller lever 140 moves in a direction away from the cam face 127 of the gear plate 126. However, since the gear plate 126 is urged in the counterclockwise direction in FIG. 15 to engage its cam face 127 with the pin 144 on the pinch roller lever 140, the cam face 127 follows the pin 144 so that the gear plate 126 is pivoted in the counterclockwise direction in FIGS. 1 and 15 around a center provided by the capstan 52. As the gear plate 126 is rocked in this manner, the gear 116 of the cam disk 114 thereon is meshed with the reel gear 62, thereby establishing a driving route from the cam disk 114 to the reel base 62 by way of which a driving force of the motor 36 is transmitted to the reel gear 62.

With the construction of the embodiment as described above, operation of the magnetic head support plate 46 will operate the pinch roller lever 140 and the gear plate 126. Accordingly, contacting of the magnetic head 44 with a tape, holding of the tape between the pinch roller 50 and the capstan 52 and starting of rotation of the reel gear 62 will occur in a directly and fully synchronized or timed relationship.

It is to be noted that, in a conventional tape feeding device, a pinch roller is normally assembled to a pinch roller lever in a following manner. In particular, a pinch roller lever has a pair of support arms for receiving a pinch roller therebetween. Thus, in assembling the pinch roller to the pinch roller lever, at first the pinch roller is positioned between the upper and lower support arms of the pinch roller lever, and then an independent pinch roller shaft is forced into holes of the upper and lower support arms and a center hole of the pinch roller. With such a construction, the center hole of the pinch roller must be registered with the holes of the support arms before the pinch roller is forced into such holes. However, such a registering step requires much skill or otherwise cannot be performed readily, which hinders rapid assembly of the part and makes its automation difficult. Besides, the shaft is required as an independent part and thus requires a higher cost accordingly.

Figure 17:
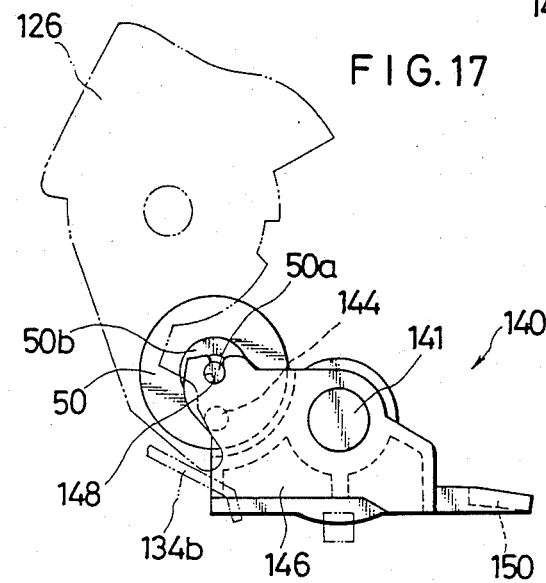
Figure 18:
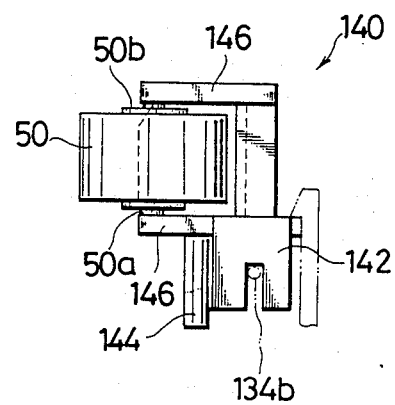
Figure 19:
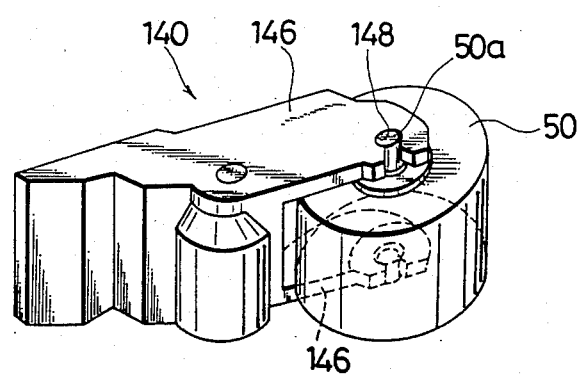
FIG. 19 is a perspective view, in a rather enlarged scale, of the pinch roller lever.

To the contrary, according to the present embodiment, the pinch roller lever 140 is made of a plastics material and has a pair of upper and lower support arms 146 in each of which a mounting hole 148 having a diameter substantially equal to the diameter of a pinch roller shaft 50a of the pinch roller 50 is formed as shown in FIGS. 17 and 19. The mounting hole 148 is opened at an edge of the pinch roller lever 140 with a width a little smaller than the diameter of the pinch roller shaft 50a. The pinch roller shaft 50a is formed in an integral relationship with a center core portion 50b of the pinch roller 50 from a plastics material by molding. With the construction described above, if the pinch roller shaft 50a is forced laterally into the mounting holes 148 in the support arms 146 of the pinch roller lever 140 via the openings, it will be admitted into the mounting holes 148 because the suppor tarms 146 will be yieldably deformed to widen the openings therein by the pinch roller shaft 50a. Then, after the pinch roller shaft 50a is fully received in the mounting holes 148 in the support arms 146, the openings inthe support arms 146 will restore their original positions due to resiliency of the support arms 146 so that the pinch roller shaft 50a will be held assuredly by the support arms 146 of the pinch roller lever 140, thereby completing assembly of the pinch roller 50 to the pinch roller lever 140.

In such an assembling step as described above, it is only necessary to force the pinch roller 50 laterally toward the pinch roller lever 140. Accordingly, assembly of the pinch roller 50 does not require much skill and can be achieved rapidly and easily, which facilitates automation of the assembling step. Further, the necessity of a shaft as an independent part is eliminated, which will allow reduction in cost accordingly.

When the cassette tape recorder is in the recording or reproducing mode, the reel gear 62 and the reel receiver 66 are normally rotated in the counterclockwise direction to wind a tape in such a manner as described above. However, before a tape comes to its end, the automatic stopping mechanism 12 does not operate due to following reasons.

Referring to FIG. 20, in the recording or reproducing mode of the cassette tape recorder, the rotation detecting member 94 is urged in the counterclockwise direction due to frictional engagement thereof with the reel receiver 66 so that the rockable member 96 is continuously urged in the clockwise direction around the shaft 98. Consequently, the slidably engaging portion 113 of the rockable member 96 is slidably engaged with the eccentric cam face 118 of the cam disk 114 (refer also to FIG. 14). So far as the rockable member 96 is urged in the clockwise direction, the slidably engaging portion 113 thereof is not disengaged from the eccentric cam face 118. In this instance, since the engaging projection 122 of the cam disk 114 is located at a position a little displaced toward the center of rotation of the cam disk 114 from a position of the minimum distance provided by the eccentric cam face 118 from the center of rotation, a gap sufficient for the slidably engaging portion 113 of the rockable member 96 to pass therethrough is left between the maximum distance providing portion of the eccentric cam face 118 and the engaging projection 122 of the cam disk 114 as seen from FIG. 12. Accordingly, the slidably engaging portion 113 will not be engaged with the engaging projection 122 so far as the slidably engaging portion 113 is slidably engaged with the eccentric cam face 118 of the cam disk 114. It is to be noted that under such circumstances the rockable member 96 will repeat its rocking motion by the eccentric cam face 118 of the cam disk 114 under the urging force provided by the rotation detecting member 94 with a magnitude provided by the eccentricity of the eccentric cam face 118. Accordingly, the slidably engaging portion 113 of the rockable member 96 will not be engaged by the engaging projection 122 of the cam disk 114. Further, so far as the slidably engaging portion 113 is not engaged by the engaging projection 122, the gear plate 126 is not pivoted and hence the pressing portion 130 on the gear plate 126 does not press against the right end extension 132 of the arresting member 26. Consequently, the arresting member 26 remains at its arresting position so that the switch 38 for the motor 36 is kept in its on state and hence the reel receiver 66 will continue its counterclockwise rotation until the tape comes to its end.

Then, when the tape comes to its end after such continued rotation of the reel receiver 66, the tension of the tape increases abruptly to disable further rotation of the reel receiver 66. As rotation of the reel receiver 66 is stopped, the reel receiver 66 no more urges the rotation detecting member 94. Consequently, the rotation detecting member 94 no more urges the rockable member 96 so that if the rockable member 96 is rocked in the counterclockwise direction to one of opposite end positions of a range of rocking motion thereof provided by the eccentric cam face 118 of the cam disk 114, it will thereafter remain at the thus rocked position. Actually, as the cam disk 114 continues its clockwise rotation, the rockable member 96 is rocked in the counterclockwise direction by the eccentric cam face 118 of the cam disk 114 until the slidably engaging portion 113 of the rockable member 96 is moved to the one end position by the minimum distance providing portion of the eccentric cam face 118. After then, the slidably engaging portion 113 will remain at the particular position spaced away from the eccentric cam face 118 of the cam disk 114, and accordingly it will subsequently be abutted by the engaging projection 122 of the cam disk 114 after about one half rotation of the cam disk 114. In this instance, the engaging projection 122 is positioned on a straight line interconnecting the center of rocking motion of the rockable member 96, that is, the shaft 98, and the slidably engaging portion 113 of the rockable member 96, and an included angle α of about 90 degrees is provided by the straight line and another straight line interconnecting the capstan 52 and a position at which the engaging projecting 122 of the cam disk 114 and the slidably engaging portion 113 of the rockable member 96 are abutted with each other (refer to FIG. 4). Accordingly, further rotation of the cam disk 114 in the clockwise direction will not move the rockable member 96 but on the contrary the gear plate 126 will receive a reactive force from the slidably engaging portion 113 of the rockable member 96 and be rocked thereby in the clockwise direction so that the gear 116 thereon will be disengaged from the reel gear 62, thereby interrupting the driving route to the reel gear 62. Simultaneously, the pressing portion 130 of the gear plate 126 is engaged with and presses against the extension 132 of the arresting member 26 to move the arresting member 26 in the rightward direction (refer to FIG. 4). As the arresting member 26 is moved rightwardly, any of the recording and reproducing operating members 16, 17 is released from arrest by the arresting member 26 and thus returned to its home position by the return spring not shown. As a result of such returning of the operating members 16, 17 to their home positions, the arresting member 26 is also allowed to return in the leftward direction to its initial position by the return spring 26. Further, as the operating members 16, 17 are returned to the home positions, the engaging member 260 is moved in the rightward direction to its home position by the urging force of the return spring 266. Upon such returning of the engaging member 260, the switch 38 for the motor 36 is turned off as seen in FIG. 3, thereby completing the automatic stopping operation.

In this manner, in the recording or reproducing mode of the cassette tape recorder 10, the automatic stopping mechanism 12 does not operate while the reel receiver 66 is being rotated to cause the rotation detecting member 94 to exert an urging force but operates when a tape comes to its end to stop rotation of the reel receiver 66 so that the urging force disappears.

Now, automatic stopping operation while the cassette tape recorder 10 is in the rewinding mode will be described. Referring to FIG. 1, when the rewinding operating member 18 is pushed in to its actuated position, the FF/REW change-over lever 74 is rocked in the counterclockwise direction to mesh the gear 76 thereon with the reel gear 78 so that the reel receiver 80 is rotated in the clockwise direction to rewind a tape. In the rewinding mode, the magnetic head support plate 46 is in its unactuated position, and hence the gear 116 of the cam disk 114 is not meshed with the reel gear 62. Further, since the winding side reel receiver 66 is rotated in the clockwise direction by tension of the tape, the rotation detecting member 94 is also urged in the clockwise direction so that the right one (in FIG. 1) of the pins 95a thereon presses against the inverted V-shaped edge 100a of the rockable member 96 to keep a slidably contacting condition of the slidably contacting portion 113 of the rockable member 96 with the eccentric cam face 118 of the cam disk 114. Accordingly, so far as the reel receivers 66, 80 are rotating, an urging force acts upon the rotation detecting member 94 and accordingly the automatic stopping mechanism 12 will not operate as described above.

However, if a tape comes to its end in the rewinding mode of the cassette tape recorder 10, rotation of the reel receivers 80, 66 is stopped. As a result, the reel receiver 66 no more exerts an urging force to act upon the rotation detecting member 94. When no urging force acts upon the rotation detecting member 94, the automatic stopping mechanism 12 operates as described above so that the gear plate 126 is rocked in the clockwise direction to move the arresting member 26 in the rightward direction in FIG. 1 to cancel the arrested condition of the rewinding operating member 18 to allow the rewinding operating member 18 to be returned to its home position by the associated return spring. Then, the arresting member 26 and the engaging member 260 are also returned to the respective home positions whereupon the motor 36 is stopped.

On the other hand, if the operating member 19 is pushed in to its actuated position to set the fast feeding mode, the FF/REW change-over lever 74 is rocked in the clockwise direction in FIG. 1 to mesh the gear 76 thereon with the idler gear 69. Thus, the reel receiver 66 is rotated at a high speed in the counterclockwise direction in order to wind a tape. Also in the fast feeding mode, the head support plate 46 remains at its unactuated position, and hence the gear 116 of the cam disk 114 does not mesh with the reel gear 62. Meanwhile, the reel receiver 66 continues to urge the rotation detecting member 94 in the clockwise direction. Accordingly, the automatic stopping mechanism 12 does not operate as described above. However, if the tape comes to its end, it becomes taut and thus disables further rotation of the reel receiver 66. As rotation of the reel receiver 66 is thus stopped, the reel receiver 66 no more exerts an urging force to act upon the rotation detecting member 94, which will result in operation of the automatic stopping mechanism 12 as described above.

Also when the pause mode is set while the cassette tape recorder 10 is in the rewinding mode or the fast feeding mode, an urging force to urge the rockable member 96 in the clockwise direction is exerted in the spring 256, which will prevent operation of the automatic stopping mechanism in error in a similar manner as describer hereinabove.

As described above, the automatic stopping mechanism 12 does not operate while the reel receiver 66 is rotating to cause the rotation detecting member 94 to exert an urging force but operates when a tape comes to its end so that rotation of the reel receiver 66 is stopped to cause the rotation detecting member 94 to stop exertion of the urging force. Accordingly, the automatic stopping mechanism 12 exhibits a fully automatic stopping feature which operates not only in any of the reproducing and the recording modes but also in any of the rewinding and the fast feeding modes of the cassette tape recorder.

The automatic stopping mechanism 12 further includes means for preventing itself from operating when the cassette tape recorder 10 is not in any of the operation modes, that is, when neither of the operation mode setting operating members 16 to 19 is in the actuated position. In particular, referring now to FIGS. 3 and 4, the automatic stopping mechanism 12 includes a spring 259 which exerts an urging force to urge the rockable member 96 in the clockwise direction around the shaft 98 when the cassette tape recorder 10 is not in any of the operation modes but does not exert an urging force when any one of the operation mode setting operating members 16 to 19 is pushed in to its actuated position. The engaging member 260 is associated with the spring 259 such that it may cause the latter to exert an urging force. The spring 259 takes, in the embodiment shown, the form of a torsion spring wrapped around a pin 268 on the base plate 34 and is arranged such that it may exert an urging force when neither one of the operating members 16 to 19 is pushed in and accordingly the engaging member 260 is in its home position. In particular, when the engaging member 260 is in its home position as shown in FIG. 3, the spring 259 is pressed at an end 259a thereof by an engaging pin 270 on the engaging member 260 while it is abutted at the other end 259b thereof by the engaging pin 110 of the rockable member 96, thereby exerting an urging force to urge the rockable member 96 in the clockwise direction around the shaft 98. As the rockable member 96 is thus acted upon by an urging force in the clockwise direction, the slidably engaging portion 113 of the rockable member 96 is slidably engaged with the eccentric cam face 118 of the cam disk 114. Then, if any one of the operating members 16 to 19, for example, the operating member 17, is pushed in to its actuated position, the pressing pin 262 of the operating member 17 will be engaged with the opposing inclined face 264 of the engaging member 260 to move the engaging member 260 in the leftward direction as shown in FIG. 4 against the urging force of the return spring 266. As the engaging member 260 is moved leftwardly in this manner, the engaging pin 270 of the engaging member 260 is moved away from the end 259a of the spring 259. Consequently, the spring 259 is put into a free condition and now exerts no urging force. This preferably occurs just before the operating member reaches its actuated position.

Thus, in the present embodiment, only when the cassette tape recorder 10 is not in any of the operation modes, the rockable member 96 is acted upon by an urging force to slidably engage the slidably engaging portion 113 thereof with the eccentric cam face 118 of the cam disk 114 as described hereinabove. This construction is effective in following cases.

(1) At first, where two cassette tape recorders of such construction as described above are used to constitute a cassette tape recorder unit of the double deck type, normally only one motor is incorporated, and a driving force of the common motor is transmitted simultaneously to both of two capstans. Here, it is assumed that the cassette tape recorder unit is used with one of the cassette tape recorders thereof set to an operation mode while the other cassette tape recorder is not set to any operation mode. In this condition, a driving force of the motor is transmitted to rotate a cam disk also in the cassette tape recorder which is not in any operation mode. Accordingly, if a slidably engaging portion of a rockable member is spaced away from an eccentric cam face of a cam disk, then there is the possibility that an engaging projection on the cam disk may abut with the slidably engaging portion of the rockable member thereby to render the automatic stopping mechanism operative. Accordingly, the automatic stopping mechanism will operate repetitively, and the cassette tape recorder will produce noises in a cyclic manner.

To the contrary, according to the construction described above wherein the slidably engaging portion 113 of the rockable member 96 is always slidably contacted with the eccentric cam face 118 of the cam disk 114 by an urging force of the spring 259 which is exerted when the cassette tape recorder is not in any operation mode, the engaging projection 122 on the cam disk 114 will not be engaged with the slidably engaging portion 113. Accordingly, the automatic stopping mechanism 12 will not be rendered operative, and hence production of noises is prevented.

(2) In normal cases, an operating member 16, 17, 18 or 19 is pushed in rapidly when manually operated, and in such a case, starting of the motor 36 and movement of the support plate 46, the change-over lever 74 and so on occur successively without significant delay. However, if an operating memeber 16, 17, 18 or 19 is pushed in slowly to such a degree that starting of the motor 36 and movement of the support plate 46, the change-over lever 74 and so on may not occur successively or if an operating member 16, 17, 18 or 19 is first pushed in to an intermediate position and then, to its actuated position after some interruption, an intended operation mode may not be established. In particular, despite that the motor 36 has been started before the operating member 16, 17, 18 or 19 is pushed in completely to its actuated position, the support plate 46, the change-over lever 74 and so on will not reach respective predetermined actuated positions until the operating member 16, 17, 18 or 19 is pushed in fully to its actuated position. Accordingly, before the support plate 46, the change-over lever 74 and so on reach the respective predetermined actuated positions, the motor 36 may be started and a driving force of the motor 36 may be transmitted to the cam disk 114. Here, if the slidably engaging portion 113 of the rockable member 96 is not slidably engaged with the eccentric cam face 118 of the cam disk 114, then there is the possibility that the engaging projection 122 on the cam disk 114 may be engaged with the slidably engaging portion 113 of the rockable member 96 thereby to render the automatic stopping mechanism 12 operative. In this case, although the operating member 16, 17, 18 or 19 has been pushed in to its actuated position, the automatic stopping mechanism 12 operates so that the operating member 16, 17, 18 or 19 is automatically returned to its home position. This disables setting of a desired operation mode.

To the contrary, the embodiment is constituted such that the spring 259 exerts an urging force when all the operating members 16 to 19 are in the respective home positions, and the urging force of the spring 259 disappears only after an operating member 16, 17, 18 or 19 is fully pushed in to its actuated position. Accordingly, operation of the automatic stopping mechanism 12 in error before an operating member 16, 17, 18 or 19 is fully pushed in can be prevented, and even if an operating member 16, 17, 18 or 19 is pushed in in an extraordinary way, setting of a desired operating mode can be attained.

It is to be noted that while in the embodiment the spring 259 takes the form of a torsion spring, it may take any other form only if it exerts an urging force when the operating members 16 to 19 are in the respective home positions. Further, while in the embodiment the engaging pin 270 on the engaging member 260 is spaced away from the end 259a of the spring 259 by movement of the engaging member 260 as an operating member 16, 17, 18 or 19 is pushed in to its actuated position in order to cause the spring 259 to exert no more urging force, the specific construction may not necessarily be employed. In other words, any other construction may be employed only if it causes the spring 259 to stop exertion of an urging force when any one of the operating members 16 to 19 is pushed in to its actuated position, and it need not be associated with the engaging member 260.

Figure 34:
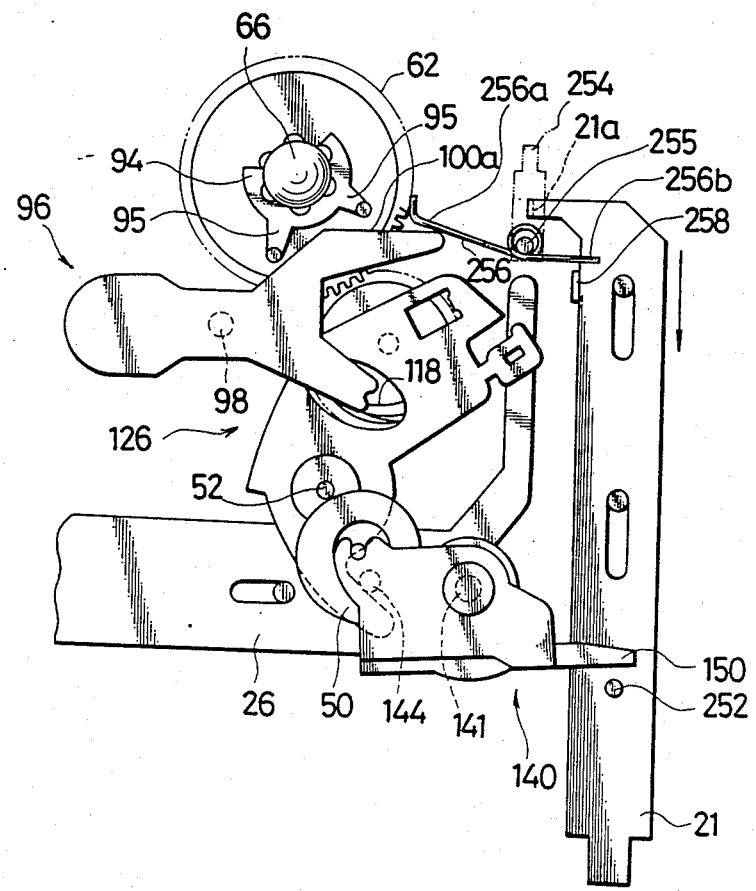

The automatic stopping mechanism 12 may additionally include means for preventing itself from operating when the temporarily stopping (pause) operating member 21 is pushed in to its actuated position while the cassette tape recorder 10 is in the recording or reproducing operation modes. Referring now to FIGS. 34 and 35, the temporarily stopping (pause) operating member 21 is associated with the pinch roller lever 140 such that, when the former is pushed in to its actuated position, the latter is rocked in the counterclockwise direction around the shaft 141. In particular, referring also to FIGS. 16 and 17, an engaging piece 150 extends from a right end of the pinch roller lever 140 above the operating member 21, and a pin 252 is mounted uprightly on the operating member 21 for engaging with the engaging piece 150 of the pinch roller lever 140.

The operating member 21 is normally urge in a direction indicated by an appended arrow mark in FIG. 34 toward its home position by a return spring not shown.

When the cassette tape recorder 10 is either in the recording mode or in the reproducing mode, the pinch roller lever 140 is positioned such that a tape may be held between the pinch roller 50 and the capstan 52 as seen in FIG. 34. However, when the temporarily stopping (pause) operating member 21 is pushed in against the urging force of the return spring, the pin 252 thereon is engaged with the engaging piece 150 of the pinch roller lever 140 to pivot the pinch roller lever 140 in the counterclockwise direction around the shaft 141. Consequently, the pinch roller 50 on the pinch roller lever 140 is moved away from the capstan 52 so that the tape will no more be held between the pinch roller 50 and the capstan 52. Accordingly, the capstan 52 will not feed the tape while it still continues to rotate, thereby establishing a temporarily stopping (pause) mode of the cassette tape recorder 10.

The temporarily stopping (pause) operating member 21 is arrested to its actuated position not by the arresting member 26 for the operation mode setting operating members 16 to 19 but by a separate arresting member 254 mounted for rocking motion on a pin 255 formed on the rear face of the base plate 34. The arresting member 254 cooperates with a bent lug 21a at an end of the operating member 21 such that when the operating member 21 is first pushed in to its actuated position, the arresting member 254 thereafter arrests the operating member 21 to its actuated position and then when the operating member 21 is pushed in for the second time, the operating member 21 is released from the arrested position by the arresting member 254 so that the operating member 21 is returned to its home position by the urging force of the associated return spring. Since the arresting member 254 is well known in the art with respect to its construction and operation, detailed construction thereof is omitted in the drawings. However, any known double action mechanism may be employed for the arresting member 254 and the temporarily stopping (pause) operating member 21.

Figure 21:
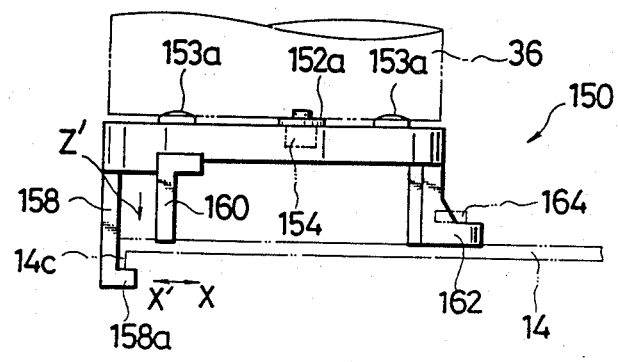
FIG. 21 is a front elevational view of a motor bracket.

A spring 256 is provided for exerting an urging force to rock the rockable member 96 in the clockwise direction when the temporarily stopping (pause) operating member 21 is pushed in. The spring 256 takes, in the embodiment shown, the form of a torsion spring which is partially wrapped around the pin 255 which provides the center of rocking motion of the arresting member 254. An end 256a of the spring 256 is positioned for pressing against a right end portion of the inverted V-shaped edge 100a of the forked portion 100 of the rockable member 96 while the other end 256b extends to the rear of an engaging lug 258 formed at a side edge of the operating member 21. As seen from FIG. 34, when the operating member 21 is not pushed in, the spring 256 takes its natural free position in which it exerts no urging force. However, if the operation member 21 is pushed in to its actuated position, the engaging lug 258 thereon is engaged with and turns the end 256b of the spring 256 around the pin 255 as seen in FIG. 21. Consequently, an urging force appears in the spring 256 and acts to press the other end 256a of the spring 256 against the edge 100a of the forked portion 100 of the rockable member 96 to urge the rockable member 96 in the clockwise direction around the shaft 98. Consequently, the rockable member 96 is rocked in the clockwise direction to slidably engage the slidably engaging portion 113 thereof with the eccentric cam face 118 of the gear plate 126.

It is to be noted that while in the embodiment the spring 256 takes the form of a torsion spring, it may take any other form only if it exerts an urging force to rock the rocking member 96 in the clockwise direction when the operating member 21 is pushed in to its actuated position. Here, where a torsion spring is used, if it is wrapped around the shaft 255 on the base plate 34 which provides the center of rocking motion of the arresting member 254, there is no necessity of provision of an additional separate mounting shaft for the torsion spring. On the other hand, while the engaging piece 258 is formed as a bent lug at the left edge of the operating member 21, it is not limited to such a specific bent lug but may otherwise assume any form such as, for example, a pin only if it is engaged with the end 256b of the spring 256 to cause the spring 256 to exert an urging force when the operating member 21 is pushed in to its actuated position.

Now, it is assumed that the temporarily stopping (pause) operating member 21 is pushed in to establish a pause mode as shown in FIG. 35 while the cassette tape recorder 10 is in the recording mode or the reproducing mode. Also in the pause mode, a driving force of the motor 36 is still transmitted via the pinion gear 58 of the capstan 52 and the intermediate gear 60 to the cam disk 114 to continuously rotate the cam disk 114 in the clockwise direction in FIG. 35. However, since the gear 116 of the cam disk 114 is out of engagement with the reel gear 62 as seen in FIG. 35, the driving force of the motor 36 is not transmitted to the reel gear 62 and consequently no urging force is applied to the rotation detecting member 94. In this manner, in the pause mode, although the pinch roller 50 is spaced away from the capstan 52 so that feeding of a tape is interrupted, a similar situation as a tape comes to its end appears in the cassette tape recorder 10.

Here, if no urging force from the reel receiver 66 acts upon the rotational detecting member 94, naturally no urging force from the rotation detecting member 94 acts upon the rockable member 96, and accordingly the rockable member 96 is now in a free condition. If the rockable member 96 is in a free condition in this manner, there is the possibility that the slidably engaging portion 113 of the rockable member 96 may be spaced away from the eccentric cam face 118 of the cam disk 114 and soon be engaged by the engaging portion 122 of the cam disk 114, which will subsequently cause pivotal motion of the gear plate 126, resulting in operation of the automatic stopping mechanism 12 in error.

Actually, however, as the temporarily stopping (pause) operating member 21 is pushed in as described above, an urging force to urge the rockable member 96 in the clockwise direction is exerted in the spring 258 (refer to FIG. 34). Consequently, although no urging force is exerted in the rotation detecting member 94, the slidably engaging portion 113 of the rockable member 96 is always slidably engaged with the eccentric cam face 118 of the cam disk 114 under the urging force of the spring 258. Accordingly, the slidably engaging portion 113 of the rockable member 96 will not be engaged by the engaging portion 122 of the cam disk 114. As a result, operation of the automatic stopping mechanism 12 in error is prevented completely.

It is to be added that the cassette tape recorder 10 of the present embodiment employs various novel structures and mechanisms other than those described hereinabove. For example, in a cassette tape recorder of a conventional construction, a motor is screwed, via a vibration absorbing rubber ring, to a motor bracket secured to a chassis. To the contrary, in the present embodiment, the motor 36 is mounted on a motor bracket 150 without using a rubber ring. Besides, the motor bracket 150 is mounted on the chassis 14 using only one screw.

Figure 22A:
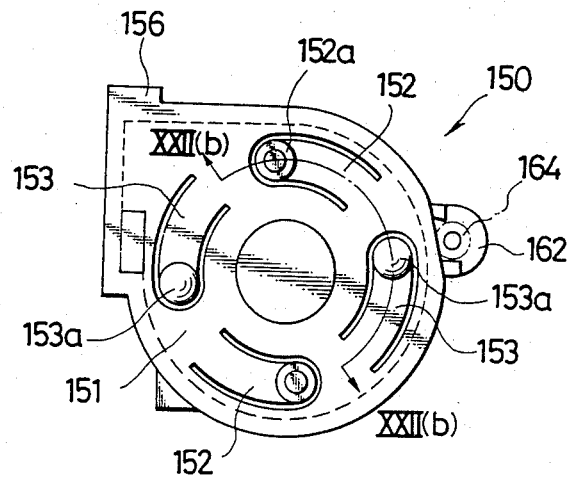
FIG. 22(a) is a bottom plan view of the motor bracket.
Figure 22B:
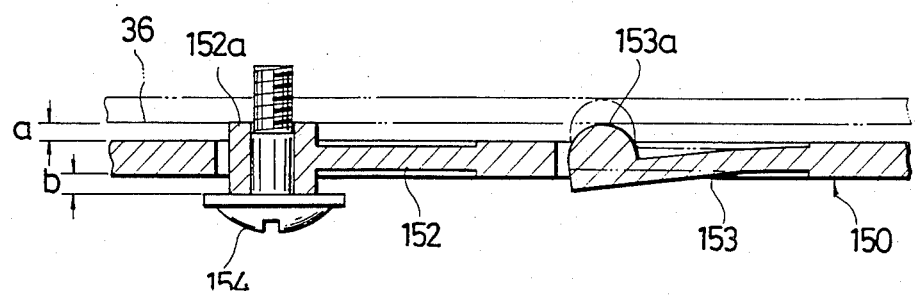
FIG. 22(b) is an enlarged cross sectional view taken along line XXII(b)—XXII(b) of FIG. 22(a)

Referring now to FIGS. 21 to 23, the motor bracket 150 is made of a plastics material and has a flattened mounting wall 151 in which two pairs of arcuate arms 152, 153 are formed alternately in a spaced relationship by an angle of 90 degrees from each other along a circle around the center axis of the motor 36 mounted on the motor bracket 150. The arcuate arms 152, 153 have a cantilever structure with its counterclockwise rear end connected integrally to the mounting wall 151 of the motor bracket 150. Accordingly, they can be resiliently deformed to a suitable degree. As seen in FIG. 22(b), a cylindrical threaded portion 152a is formed at a free end of each of the arcuate arms 152 at which the arcuate arm 152 exhibits its maximum deformation while a semispherical projection 153a is formed at a free end of each of the other arcuate arms 153. It is to be noted that the cylindrical threaded portions 152a and the semispherical projections 153 do not have an equal height relative to an upper face of the mounting wall 151 of the motor bracket 150, and as seen in FIG. 22(b), the height of the threaded portions 152 is greater than that of the semispherical projections 153a. Thus, in assembling the motor 36 to the motor bracket 150, at first the motor 36 is placed on the mounting wall 151 of the motor bracket 150, and then a screw 154 is screwed into each of the cylindrical threaded portions 152a as seen in FIG. 22(b) to fasten the motor 36 to the motor bracket 150. In this instance, the arcuate arms 153 are pushed at the semispherical projections 153a thereof by the motor 36 and deformed downwardly thereby until the top ends of the projections 153a come to the same height with the cylindrical threaded portions 152a. Consequently, the motor 36 is resiliently supported at a total of four positions thereof by the cylindrical threaded portions 152a and the semispherical projections 153a of the arcuate arms 152, 153, respectively, of the motor bracket 150. Accordingly, vibrations of the motor 36 are absorbed sufficiently due to elastic deformation of the arcuate arms 152, 153 of the motor bracket 150, and hence transmission of vibrations of the motor 36 to the chassi 14 is prevented. Further, even if the entire cassette tape recorder is acted upon by external vibrations caused by a shock, for example, during transportation of the cassette tape recorder, the magnitude of vibrations of the motor 36 is limited to a range of a total of distances a and b shown in FIG. 22(b). Accordingly, there is no possibility that the motor 36 is vibrated to an excessive degree to break the arcuate arms 152, 153 of the motor bracket 150.

As shown in FIGS. 21 and 23, the motor bracket 150 has two arresting fingers 156, 158 and two pressing fingers 160, 162 all extending downwardly from the mounting wall 151. The arresting finger 156 is bifurcated to define therein a downwardly opened slit 156a in which an upwardly bent lug 14b of the chassis 14 can be received. The arresting finger 156 is tapered at a lower end adjacent the slit 156a thereof so as to facilitate insertion of the upwardly bent lug 14b into the slit 156a. Thus, if the motor bracket 150 is mounted in position on the chassis 14 with the upwardly bent lug 14b thereof received in the slit 156a of the arresting finger 156 of the motor bracket 150, the motor bracket 150 is held from movement in a Z direction and also in Y and Y' directions in FIG. 23. Meanwhile, the other arresting finger 158 has at a lower end thereof an inwardly bent lug 158a which cooperates with an inner face of the arresting finger 158 to hold therein a downwardly bent lug 14c of the chassis 14. Accordingly, if the motor bracket 150 is mounted in position on the chassis 14 with the downwardly bent lug 14c of the chassis 14 held by the arresting finger 158, the motor bracket 150 is held from movement in an X direction in FIG. 21. Further, the pressing fingers 160, 162 extend downwardly until they abut with the upper face of the chassis 14, thereby holding the motor bracket 150 from moving in a Z' direction in FIGS. 21 and 22. In this manner, the motor bracket 150 is held from movement in the Z, Z', Y, Y' and X directions relative to the chassis 14, and movement of the motor bracket 150 in the remaining X' direction in FIG. 21 is prevented by a screw 162 screwed into threaded holes formed in the pressing finger 162 of the motor bracket 150 and the chassis 14 to secure the motor bracket 150 to the chassis 14.

With the construction described above, the motor 36 can be assembled to the motor bracket 150 without using a vibration absorbing rubber ring, and besides the motor bracket 150 can be assembled to the chassis 14 using only one fastening screw. Accordingly, the number of components is reduced, and an assembly step can be achieved rapidly and easily, facilitating automation of such assembly.

Meanwhile, the erasing head 48 can be assembled to an erasing head lever 166 by a simple operation and the erasing head lever 166 itself can be assembled to the base plate 34 by a simple operation. Referring particularly to FIGS. 24 and 25, the erasing head lever 166 is made of a plastics material and has a pair of hooked fingers 168 formed to extend upwardly therefrom. The hooked fingers 168 are spaced apart from each other by a distance corresponding to the width of the erasing head 48. With the construction described just above, if the erasing head 48 is pushed into a spacing between the pair of hooked fingers 168 of the erasing head lever 166 from above while resiliently deforming the hooked fingers 168 outwardly due to outwardly inclined faces formed at top ends of the hooked fingers 168 until the erasing head 48 is received by the erasing head lever 166, then the hooked fingers 168 will resiliently return to their respective original positions thereby to hold the erasing head 48 assuredly therebetween. In tihs manner, the erasing head 48 can be assembled rapidly and easily to the erasing head lever 166 without using a fastening part such as a screw, which facilitates automation of such assembly.

Further, the erasing head lever 166 has a hub 160 formed at an end thereof, and a flange piece 170 is formed at a lower end of the hub 169. In assembling the erasing head lever 166 to the base plate 34, at first the hub 169 of the erasing head lever 166 is fitted onto a shaft 171 on the base plate 34 and moved down along the shaft 171 while resiliently deforming a hooked finger 171 on the base plate 34 outwardly in a similar manner as the hooked fingers described hereinabove. Thus, when the erasing head lever 166 reaches an upper face of the base plate 34, the hooked finger 171 is resiliently returned to its original position to arrest the flange piece 170 of the hub 169, thereby completing assembly of the erasing head lever 166. It is to be noted that while in the present embodiment the flange piece 170 is formed at part of the lower end of the hub 169 of the erasing head lever 166, it may otherwise be formed around the entire periphery of the hub 169 or else it may be formed not at the lower end but an intermediate portion of the hub 169. In this manner, the flange piece 177 of the erasing head lever 166 is arrested by the hooked finger 171a on the base plate 34. Accordingly, the erasing head lever 166 can be assembled to the base plate 34 in a simple operation without using a fastening element such as a screw, which facilitates automation of such assembly.

In the meantime, normally in a cassette tape recorder with a cassette holder, a tape cassette is first inserted into the cassette holder not shown and then the cassette holder is pivoted to an open position in which a reel hub within the cassette can be mounted in position on a reel receiver. In this instance, the cassette holder is arrested by a locking member named an E-slide lever. Normally, the E-slide lever is mounted for sliding movement on a base plate. Thus, as a stopping and ejecting operating member is pushed in to its actuated position, the E-slide lever is slid to release the cassette holder from arresting engagement by the E-slide lever thereby to allow the cassette holder to be pivoted to the open position at which the cassette can be removed from the cassette holder and a new cassette can be placed into the cassette holder.

In a known construction, the E-slide lever is mounted on the base plate by means of a screw which also serves as a guide for the E-slide lever. To the contrary, in the present embodiment, the E-slide lever 172 can be assembled to the chassis 14 by a simple operation without using a screw.

Figure 26:
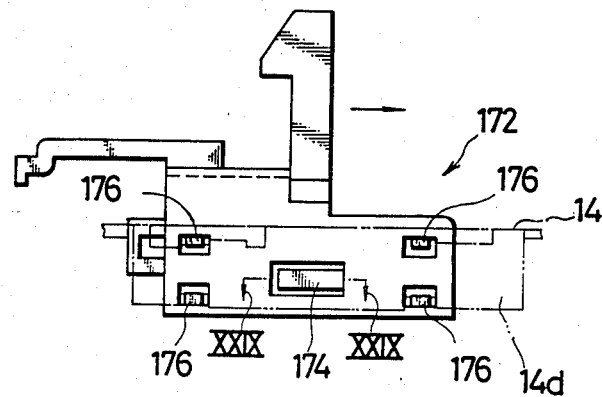
FIGS. 26, 27 and 28 are a front elevational view, a plan view and a left-hand side elevational view, respectively, of an E-slide lever.
Figure 27:
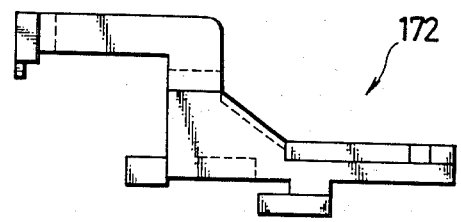
Figure 28:
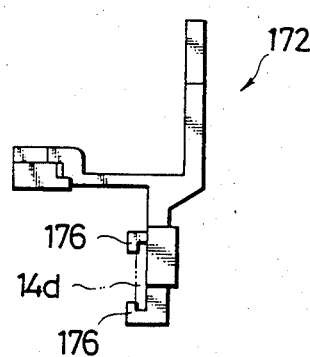
Figure 29:
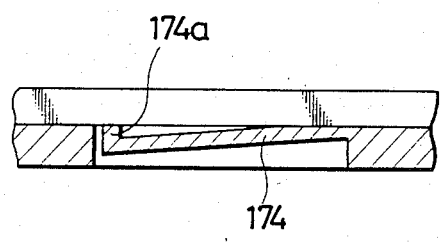
FIG. 29 is an enlarged cross sectional view taken along line XXIX—XXIX of FIG. 26.
Figure 30:
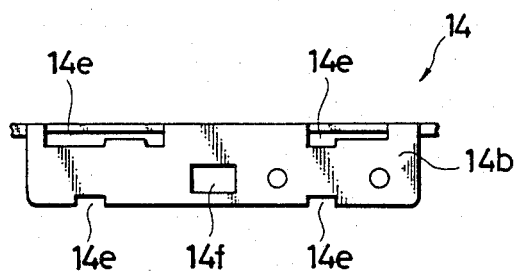
FIGS. 30 and 31 are a front elevational view and a plan view, respectively, of a right-hand side bent portion of a chassis.
Figure 31:
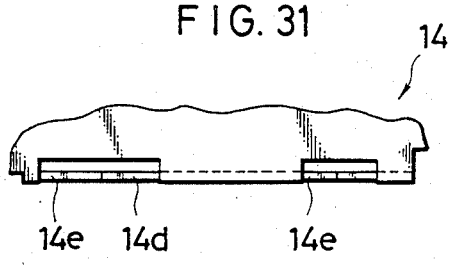

In particular, referring to FIGS. 26 to 28, the E-slide lever 172 is made of a plastics material and has a resilient finger 174 and four arresting pieces 176. The four arresting pieces 174 are located at vertically and horizontally symmetrical positions as seen in FIG. 26 so that they can hold a rightward extension 14d of the chassis 14 from above and below. The resilient finger 174 of the E-slide lever 172 has a bent lug 174a formed at a free end thereof (refer to FIG. 29). On the other hand, the rightward extension 14d of the chassis 14 has formed therein four recesses 14e through which the arresting pieces 176 can extend and an opening 14f through which the bent lug 174a of the resilient finger 174 can extend.

Thus, in assembling the E-slide lever 172 to the chassis 14, at first the four arresting pieces 176 of the E-slide lever 172 are fitted into the recesses 14e of the chassis 14 as seen in FIG. 26, and then it is slid rightwardly until the rightward extension 14d of the chassis 14 is held between the upper and lower arresting pieces 176. In this instance, the bent lug 174a of the resilient finger 174 of the E-slide lever 172 is snapped into the opening 14d of the chassis 14 so that movement of the E-slide lever 172 is thereafter limited by the chassis 14, thereby completing assembly of the E-slide lever 172 to the chassis 14. In this manner, also the E-slide lever 172 can be assembled by a simple operation without using a fastening element such as a screw.

Figure 32:
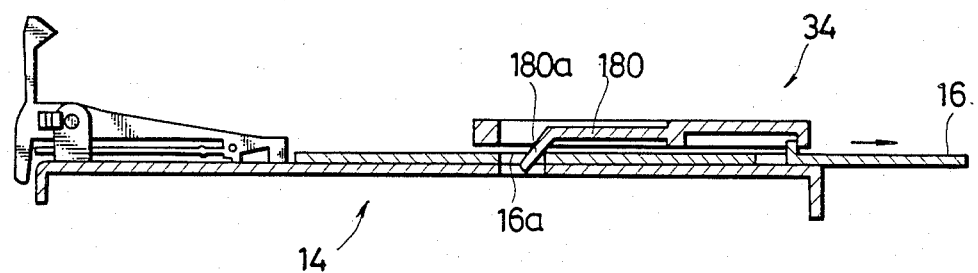
FIG. 32 is an enlarged cross sectional view of the chassis taken along line XXXII—XXXII of FIG. 1.
Figure 33:
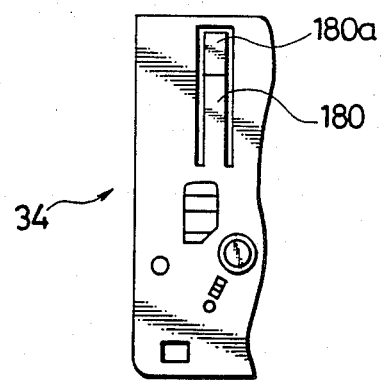
FIG. 33 is a partial plan view of a base plate.

In addition, in the present embodiment, mutually engaging portions are provided on the recording operating member 16 and the reproducing operating member 17 so that when the recording operating member 16 is pushed in to its actuated position, the reproducing operating member 17 may be moved by the operating member 16 to its actuated position. Further, the recording operating member 17 is returned to its normal position by the return spring provided for the reproducing operating member 16. However, due to the presence of a gap in a back and forth direction between the mutually engaging portions of the recording operating member 16 and the recording operating member 17 when the recording operating member 16 is in its unactuated (home) position, there is the possibility that the recording operating member 17 may flutter or vibrate inadvertently. Therefore, according to the present embodiment, a resilient finger 180 is formed on the base plate 34 and has an obliquely downwardly extending bent portion 180a formed at an end thereof, as shown in FIGS. 32 and 33. The bent portion 180a of the resilient finger 180 extends into an opening 16a formed in the operating member 16. Thus, when the operating member 16 is at its unactuated position, the bent portion 180a of the resilient finger 180 abuts with an edge of the opening 16a of the operating member 16 to urge the operating member 16 in a direction indicated by an arrow mark in FIG. 32 thereby to prohibit inadvertent free movement of the operating member 16 relative to the base plate 34. Consequently, appearance of vibrations of the operating member 16 in its unactuated position is prevented.

As apparent from the foregoing description, an automatic stopping mechanism according to the present invention does not operate irrespective of a direction of rotation of a reel receiver while the reel receiver is rotating to cause a rotation detecting member to exert an urging force but operates when a tape comes to its end so that rotation of the reel receiver is stopped to cause the rotation detecting member to exert no more urging force. Accordingly, the automatic stopping mechanism exhibits a fully automatic stopping feature wherein it operates in response to arrival of an end of a tape when the tape feeding device is not only in any of reproducing and recording modes but also in any of rewinding and fast feeding modes. Besides, a tape can be fed in a stabilized condition as distinct from a conventional construction in which a tension arm is employed. Further, the contacting force of a pinch roller against a capstan need not be very high, and accordingly bearing means for the capstan can be designed readily.

Having now fully described the invention, it will be apparent to one of ordinary skill in the art that many changes and modifications can be made thereto without departing from the spirit and scope of the invention as set forth herein.

What is claimed is:

1. An automatic stopping mechanism for a tape feeding device which includes a reel receiver, a reel base for rotating said reel receiver through frictional contact therebetween, a constantly rotating capstan, a pinch roller that is selectively brought into contact with said capstan with a tape interposed between and means for selecting one of a plurality of operation modes in which said tape feeding device is to operate, comprising:
   a mode maintaining element for cooperating with said means for selecting to maintain the selected operation mode of said tape feeding device;
   a cam disk connected to be rotated in one direction by said capstan and having thereon an eccentric cam face and an engaging element at a position spaced from said eccentric cam face;
   a rockable member mounted for rocking motion around a fixed axis and having a cam follower at a position thereof spaced from said fixed axis;
   a rotation detecting member mounted in frictional contact with said reel receiver for exerting an urging force in a direction of rotation of said reel receiver to urge said rockable member to contact said cam follower with said eccentric cam face of said cam disk so that said rockable member may be rocked by said eccentric cam face of said cam disk; and
   a movable releasing member supporting said cam disk for rotation thereon and movable between a neutral position and an operative position in which a driving force of said cam disk is transmitted to said reel base, said cam disk being located such that when rotation of said reel receiver is stopped and consequently said rockable member is pivoted to and thereafter remains at one of end positions of a range of rocking motion thereof until said engaging element of said cam disk is engaged with said cam follower of said rockable member, further rotation of said cam disk will cause a pushing force of said engaging element to act substantially toward a center of the rocking motion of the rockable member, so that said engaging element is acted upon by the resulting reactive force from said rockable member so that said movable releasing member will be moved away from said operative position to said neutral position and the pinch roller will be separated from the capstan thereby causing said mode maintaining element to cancel the operation mode of said tape recorder.

2. An automatic stopping mechanism as claimed in claim 1, wherein said movable releasing member is a lever mounted for pivotal motion around an axis of rotation of said capstan.

3. An automatic stopping mechanism as claimed in claim 1, wherein said cam disk is located on said movable releasing member such that when said engaging element of said cam disk is engaged with said cam follower of said rockable member, a line interconnecting said fixed axis of said rockable member and a particular position at which said engaging element is engaged with said cam follower and another line interconnecting the particular position and an axis of rotation of said cam disk intersect each other by an angle of about 90 degrees.

4. An automatic stopping mechanism as claimed in claim 1, wherein said rockable member has a weight portion located remotely from said cam follower such that the center of gravity of said rockable member may substantially coincide with said fixed axis of said rockable member.

5. An automatic stopping mechanism as claimed in claim 1, further comprising means for urging said rockable member to contact said cam follower with said eccentric cam face of said cam disk only when said tape feeding device is not in any of the operation modes.

6. An automatic stopping mechanism as claimed in claim 5, wherein said means for urging includes a spring, and a spring controlling member having a first position in which said spring is caused to exert an urging force to urge said rockable member to contact said cam follower with said eccentric cam face of said cam disk and a second position in which said spring is caused to exert no urging force, said spring controlling member assuming the first position when none of the operation modes is selected but assuming the second position when one of the operating modes is selected.

7. An automatic stopping mechanism as claimed in claim 6, wherein said spring is a torsion spring having a central portion secured at a fixed position, one end of said spring being located for engagement with said rockable member while the other end is located for engagement with said spring controlling member.

8. An automatic stopping mechanism as claimed in claim 6, wherein said spring controlling member is movable between at least a first and a second position, said member being associated with a switch for controlling a driving source for said capstan such that when the former is moved to the first position, the latter is turned on to render said driving source operative, but when the former is moved to the second operation, the latter is turned off to render said driving source inoperative.

9. An automatic stopping mechanism as claimed in claim 1, wherein said tape feeding device further includes a selectively operable temporarily stopping operating member mounted for movement between a normal inoperative position and an operative position in which operation of said tape feeding device in any of the operation modes is temporarily stopped, said automatic stopping mechanism further comprising means for urging said rockable member to contact said cam follower with said eccentric cam face of said cam disk only when said tape temporarily stopping operating member is in the operative position.

10. An automatic stopping mechanism as claimed in claim 9, wherein said means for urging is a torsion spring having a central portion secured at a fixed position, one end of said spring being located for engagement with said temporarily stopping operating member while the other end is located for engagement with said rockable member.

11. An automatic stopping mechanism for a tape feeding device which includes a reel receiver, a reel base for rotating said reel receiver through frictional contact therebetween, a normally rotating capstan, a pinch roller that is selectively brought into contact with said capstan with a tape interposed therebetween and an operating mode setting operating member for putting said tape feeding device into an operation mode when brought to an operated position, comprising:
  an arresting member which is moved, in response to movement of said operating member to the operated position, to an arresting position in which said arresting member arrests said operating member in a actuated position;
  a rotation detecting member mounted in coaxial relationship and in frictional contact with said reel receiver such that when said reel receiver rotates, said rotation detecting member is urged in a direction of rotation of said reel receiver;
  a rockable member mounted for rocking motion and having a slidably engaging portion, said rockable member being urged in a predetermined fixed direction by said rotation detecting member while said reel receiver is rotating in any direction;
  a cam disk having an annular eccentric cam face for sliding engagement by said slidably engaging portion of said rockable member and an engaging portion located in a spaced relationship from said eccentric cam face, said cam disk being connected to be constantly driven to rotate by said capstan; and
  a releasing member supporting said cam disk for rotation thereon and mounted for rocking motion around said capstan from and to a position in which said cam disk is engaged with said reel base to allow rotation of said capstan to be transmitted to said reel base;
  whereby, when rotation of said reel receiver is stopped to cause said rotation detecting member to stop exertion of an urging force, said slidably engaging portion of said rockable member remains at a position spaced away from said eccentric cam face of said cam disk until said slidably engaging portion is abutted by said engaging portion of said cam disk so that as said cam disk is further rotated and a pushing force of said engaging portion acts substantially toward a center of the rocking motion of the movable member, said releasing member is rocked by the resulting reactive force applied thereto from said slidably engaging portion of said rockable member to move said cam disk out of engagement with said reel base to interrupt a driving route from said cam disk to said reel base, to separate said pinch roller from the capstan and to move said arresting member out of arresting engagement with said operating member.

12. An automatic stopping mechanism according to claim 11, wherein a spring means is interposed between said rockable member and a temporarily stopping operating member for temporarily stopping operation of said tape feeding device in the operation mode such that when said temporarily stopping operating member is moved to an actuated position while said operation mode setting operating member is arrested to its actuated position, a pressing force of said temporarily stopping operating member may act upon said rockable member via said spring means to prevent said sliding portion of said rockable member from being spaced away from said eccentric cam face of said cam disk.

13. An automatic stopping mechanism according to claim 11, wherein a spring means is interposed between said operation mode setting operating member and said rockable member such that when said operation mode setting operating member is in a neutral position, said rockable member may be acted upon by an urging force via said spring means to prevent said sliding portion of said rockable member from being spaced away from said eccentric cam face of said cam disk.

* * * * *